(12) United States Patent
Yamada

(10) Patent No.: US 9,807,597 B2
(45) Date of Patent: Oct. 31, 2017

(54) METHOD OF A COMMUNICATION DEVICE FOR CONTROLLING DISPLAY OF CALL HISTORY

(71) Applicant: KYOCERA Corporation, Kyoto-shi, Kyoto (JP)

(72) Inventor: Yuki Yamada, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/177,235

(22) Filed: Jun. 8, 2016

(65) Prior Publication Data

US 2016/0286381 A1 Sep. 29, 2016

Related U.S. Application Data

(63) Continuation of application No. PCT/JP2014/082966, filed on Dec. 12, 2014.

(30) Foreign Application Priority Data

Dec. 12, 2013 (JP) .................................. 2013-257507

(51) Int. Cl.
H04W 12/02 (2009.01)
H04W 8/18 (2009.01)
(Continued)

(52) U.S. Cl.
CPC ..... *H04W 8/183* (2013.01); *H04M 1/274533* (2013.01); *H04M 1/57* (2013.01);
(Continued)

(58) Field of Classification Search
CPC .... H04M 1/274533; H04M 1/56; H04M 1/57; H04M 2250/60; H04M 1/576;
(Continued)

(56) References Cited

U.S. PATENT DOCUMENTS 9,032,305 B2 * 5/2015 Ro .................. G06F 3/0482
715/739
2007/0293193 A1 * 12/2007 Ramsten ............. H04M 1/2745
455/411
(Continued)

FOREIGN PATENT DOCUMENTS

JP 2004-056694 A 2/2004
JP 2005-142863 A 6/2005
(Continued)

OTHER PUBLICATIONS

International Search Report and Written Opinion of the International Searching Authority issued by the Japanese Patent Office for International Application No. PCT/JP2014/082966.

*Primary Examiner* — Meless Zewdu
(74) *Attorney, Agent, or Firm* — Procopio Cory Hargreaves and Savitch LLP

(57) ABSTRACT

A communication device of an aspect includes a communication unit configured to make a communication with another communication device, a memory configured to store a control program, and at least one processor configured to execute a process in accordance with the operation by executing the control program. The memory includes a first storage unit configured to store history information related to the communication and contact information including identification information for identifying the other communication device. The at least one processor is configured to cause a display to display the history information, delete from the first storage unit the contact information selected based on the operation received by an operation unit, and hide the history information on the display when the contact information is to be deleted from the first storage
(Continued)

REGISTRANT LIST SCREEN
(WITH MENU WINDOW DISPLAYED THEREON)

unit, the history information including the identification information included in the contact information to be deleted.

5 Claims, 32 Drawing Sheets

(51) Int. Cl.
  *H04M 1/2745* (2006.01)
  *H04M 1/57* (2006.01)
  *H04M 1/725* (2006.01)
(52) U.S. Cl.
  CPC ...... *H04M 1/274508* (2013.01); *H04M 1/576* (2013.01); *H04M 1/72552* (2013.01); *H04M 2250/60* (2013.01)
(58) Field of Classification Search
  CPC ....... H04M 1/72552; H04M 1/274508; H04M 1/725; H04M 1/2745; H04M 1/575; H04M 1/72583; H04W 8/183; H04W 8/18; H04W 12/00; H04W 88/02; H04W 92/08; H04W 12/02; H04W 4/02; H04W 92/02
  See application file for complete search history.

(56) References Cited

U.S. PATENT DOCUMENTS

| | | | | |
|---|---|---|---|---|
| 2008/0247527 | A1* | 10/2008 | Nagata | H04M 1/2745 379/142.06 |
| 2009/0131028 | A1* | 5/2009 | Horodezky | H04M 1/274516 455/418 |
| 2010/0274792 | A1* | 10/2010 | Bhangi | H04M 1/274583 707/754 |
| 2011/0009101 | A1* | 1/2011 | Cho | H04M 1/274516 455/414.1 |
| 2011/0034156 | A1* | 2/2011 | Gatti | H04M 1/2745 455/415 |
| 2013/0007900 | A1* | 1/2013 | Santhanu | G06F 21/31 726/30 |

FOREIGN PATENT DOCUMENTS

| | | |
|---|---|---|
| JP | 2008-252370 A | 10/2008 |
| JP | 2011-205584 A | 10/2011 |

* cited by examiner

FIG.1B
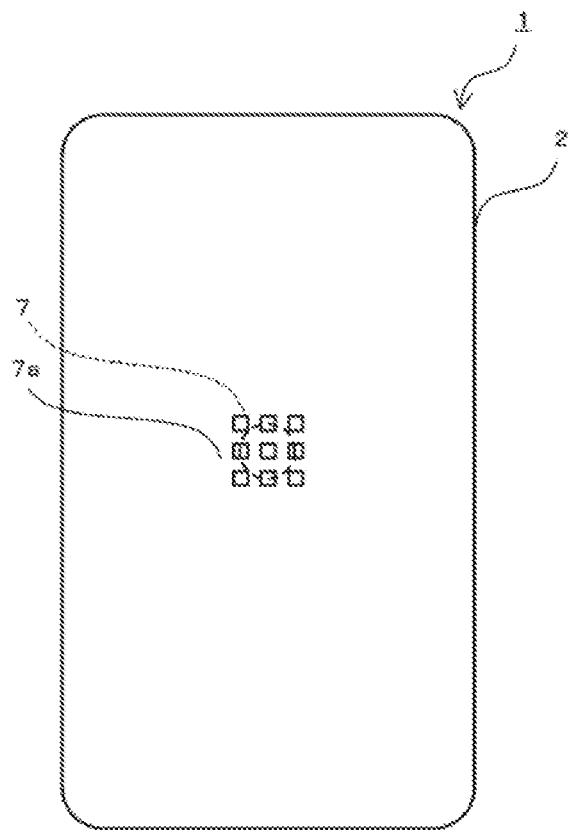
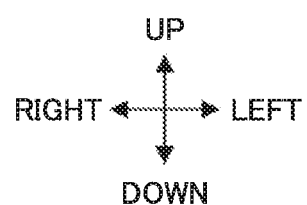

FIG.3

PHONEBOOK TABLE

| REGISTRATION NUMBER | NAME | TELEPHONE NUMBER | E-MAIL ADDRESS | ADDRESS |
|---|---|---|---|---|
| 001 | *  | XXXXXXXXXX | @.* | ****** |
| 002 | *** * | XXXXXXXXXX | ***@.* | ******* |
| 003 | * ** | XXXXXXXXXX | @.* | |
| 004 | ****** ** | XXXXXXXXXX | | ****** |
| 005 | * ** | XXXXXXXXXX | @*.* | ******* |
| 006 | ***** *** | | | |
| ...... | ...... | ...... | ...... | ...... |

12a

} PHONEBOOK INFORMATION

FIG.4A

CALL ORIGINATION HISTORY TABLE 12b

| TELEPHONE NUMBER | CALL ORIGINATED DATE AND TIME | DISPLAY FLAG |
|---|---|---|
| XXXXXXXXXX | XX XX XX:XX | 1 |
| XXXXXXXXXX | XX XX XX:XX | 1 |
| XXXXXXXXXX | XX XX XX:XX | 0 |
| XXXXXXXXXX | XX XX XX:XX | 1 |
| XXXXXXXXXX | XX XX XX:XX | 1 |
| ⋮ | ⋮ | |

CALL ORIGINATION HISTORY INFORMATION

FIG.4B

CALL RECEPTION HISTORY TABLE 12c

| TELEPHONE NUMBER | CALL RECEIVED DATE AND TIME | DISPLAY FLAG |
|---|---|---|
| XXXXXXXXXX | XX XX XX:XX | 1 |
| XXXXXXXXXX | XX XX XX:XX | 1 |
| XXXXXXXXXX | XX XX XX:XX | 1 |
| XXXXXXXXXX | XX XX XX:XX | 0 |
| XXXXXXXXXX | XX XX XX:XX | 1 |
| ⋮ | ⋮ | |

CALL RECEPTION HISTORY INFORMATION

FIG.4C

MISSED CALL HISTORY TABLE

| TELEPHONE NUMBER | CALL RECEIVED DATE AND TIME | DISPLAY FLAG |
|---|---|---|
| XXXXXXXXXX | XX XX XX:XX | 1 |
| XXXXXXXXXX | XX XX XX:XX | 0 |
| XXXXXXXXXX | XX XX XX:XX | 1 |
| XXXXXXXXXX | XX XX XX:XX | 1 |
| XXXXXXXXXX | XX XX XX:XX | 1 |
| ⋮ | ⋮ | |

12d

MISSED CALL HISTORY INFORMATION

HOME SCREEN

DIAL SCREEN

PHONE CALL SCREEN

REGISTRANT LIST SCREEN

REGISTRANT LIST SCREEN
(WITH MENU WINDOW DISPLAYED THEREON)

CONTACT DELETION SCREEN

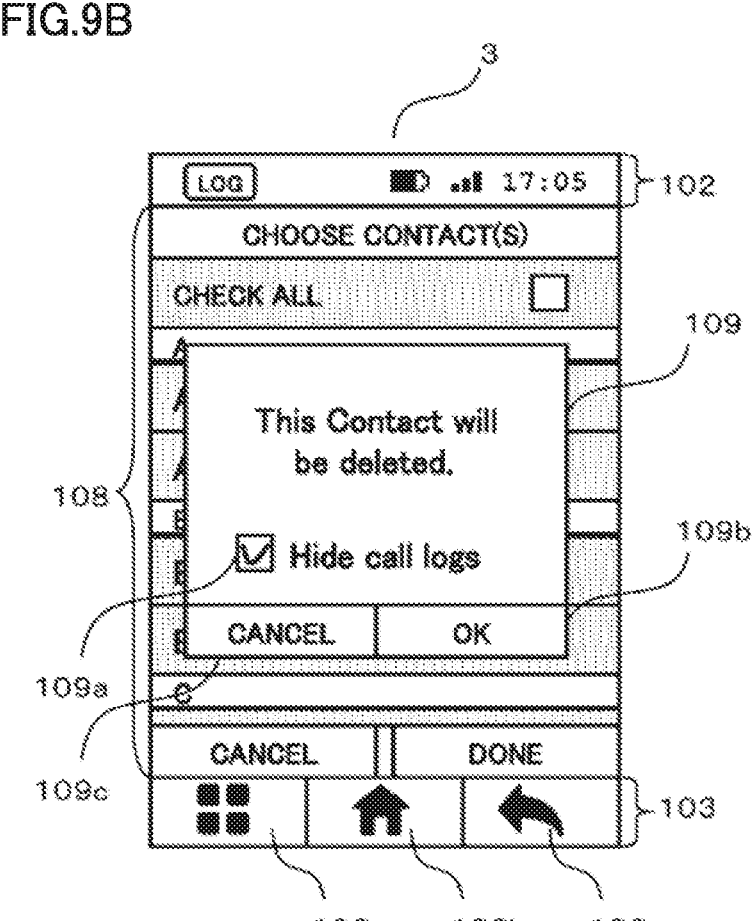
CONTACT DELETION SCREEN
(WITH CONFIRMATION WINDOW DISPLAYED THEREON)

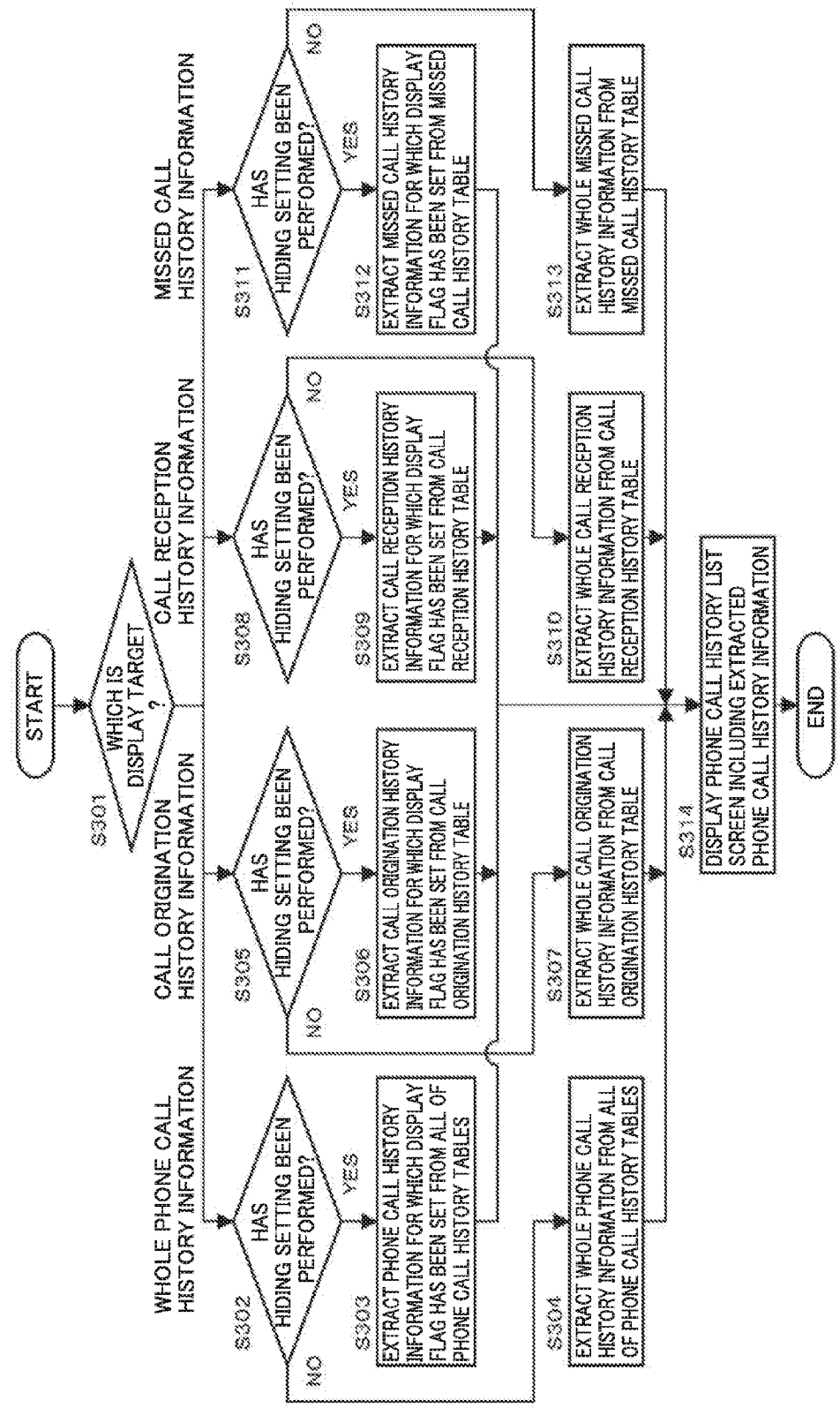

PHONE CALL HISTORY LIST SCREEN
(DISPLAY FLAG HAS BEEN RESET AND
HIDING SETTING HAS BEEN MADE)

PHONE CALL HISTORY LIST SCREEN
(DISPLAY FLAG HAS BEEN SET OR
HIDING SETTING HAS BEEN CANCELED)

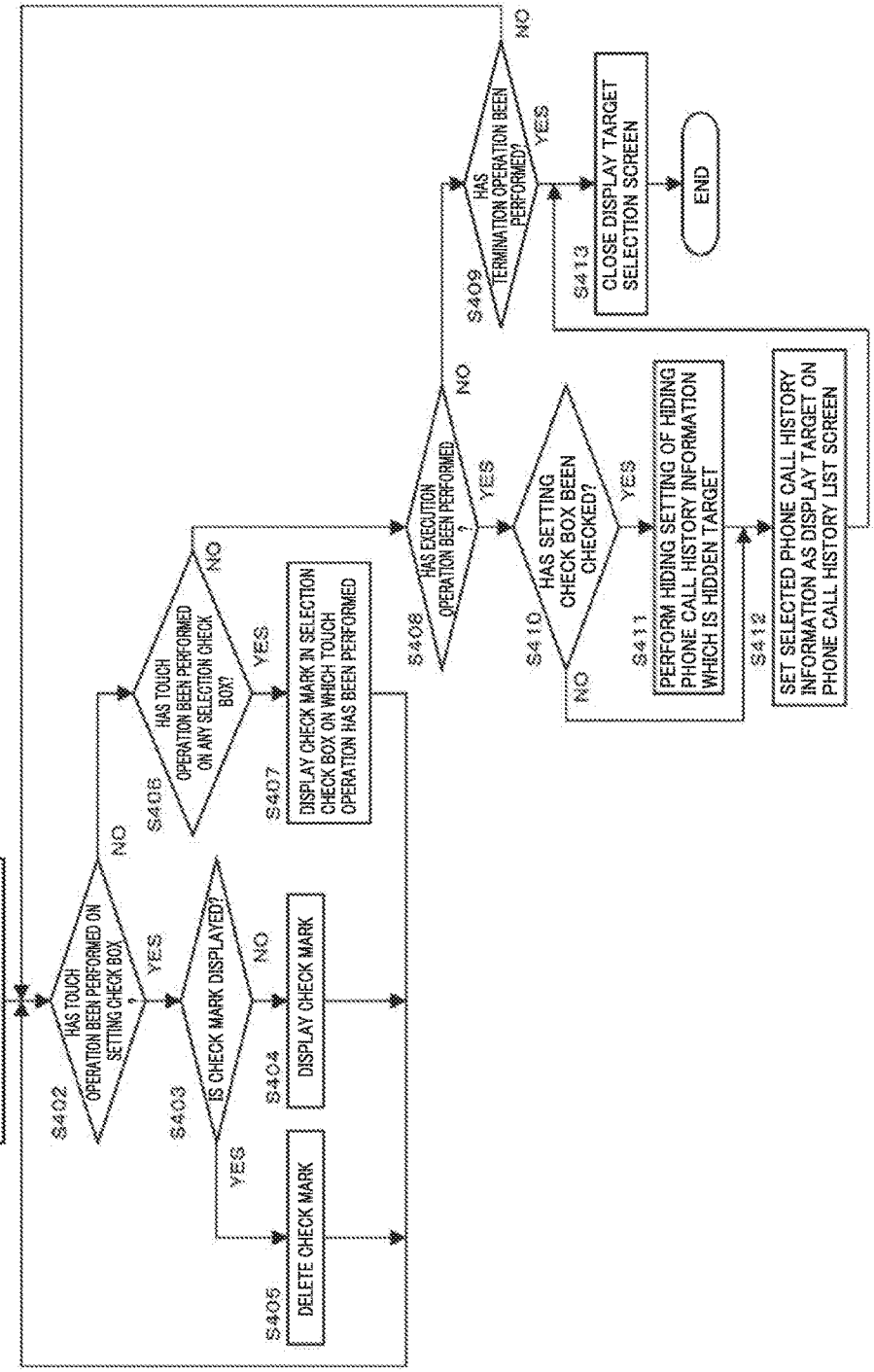

PHONE CALL HISTORY LIST SCREEN
(WITH MENU WINDOW DISPLAYED THEREON)

DISPLAY TARGET SELECTION SCREEN

HIDDEN TARGET CANCEL SCREEN

FIG.15A

CALL ORIGINATION HISTORY TABLE 12b

| TELEPHONE NUMBER | CALL ORIGINATED DATE AND TIME |
|---|---|
| XXXXXXXXXX | XX XX XX:XX |
| XXXXXXXXXX | XX XX XX:XX |
| XXXXXXXXXX | XX XX XX:XX |
| XXXXXXXXXX | XX XX XX:XX |
| XXXXXXXXXX | XX XX XX:XX |
| ⋮ | ⋮ |

CALL ORIGINATION HISTORY INFORMATION

FIG.15B

CALL RECEPTION HISTORY TABLE 12c

| TELEPHONE NUMBER | CALL RECEIVED DATE AND TIME |
|---|---|
| XXXXXXXXXX | XX XX XX:XX |
| XXXXXXXXXX | XX XX XX:XX |
| XXXXXXXXXX | XX XX XX:XX |
| XXXXXXXXXX | XX XX XX:XX |
| XXXXXXXXXX | XX XX XX:XX |
| ⋮ | ⋮ |

CALL RECEPTION HISTORY INFORMATION

FIG.15C

MISSED CALL HISTORY TABLE  12d

| TELEPHONE NUMBER | CALL RECEIVED DATE AND TIME |
|---|---|
| XXXXXXXXXX | XX XX XX:XX |
| XXXXXXXXXX | XX XX XX:XX |
| XXXXXXXXXX | XX XX XX:XX |
| XXXXXXXXXX | XX XX XX:XX |
| XXXXXXXXXX | XX XX XX:XX |
| ⋮ | ⋮ |

MISSED CALL HISTORY INFORMATION

DISPLAY TARGET SELECTION SCREEN

FIG.19

AUXILIARY PHONE CALL HISTORY TABLE 12e

| TELEPHONE NUMBER | CALL ORIGINATED DATE AND TIME | TYPE |
|---|---|---|
| XXXXXXXXXX | XX XX XX:XX | ORIGINATED |
| XXXXXXXXXX | XX XX XX:XX | RECEIVED |
| XXXXXXXXXX | XX XX XX:XX | ORIGINATED |
| XXXXXXXXXX | XX XX XX:XX | MISSED |
| XXXXXXXXXX | XX XX XX:XX | RECEIVED |
| ⋮ | ⋮ | |

PHONE CALL HISTORY INFORMATION

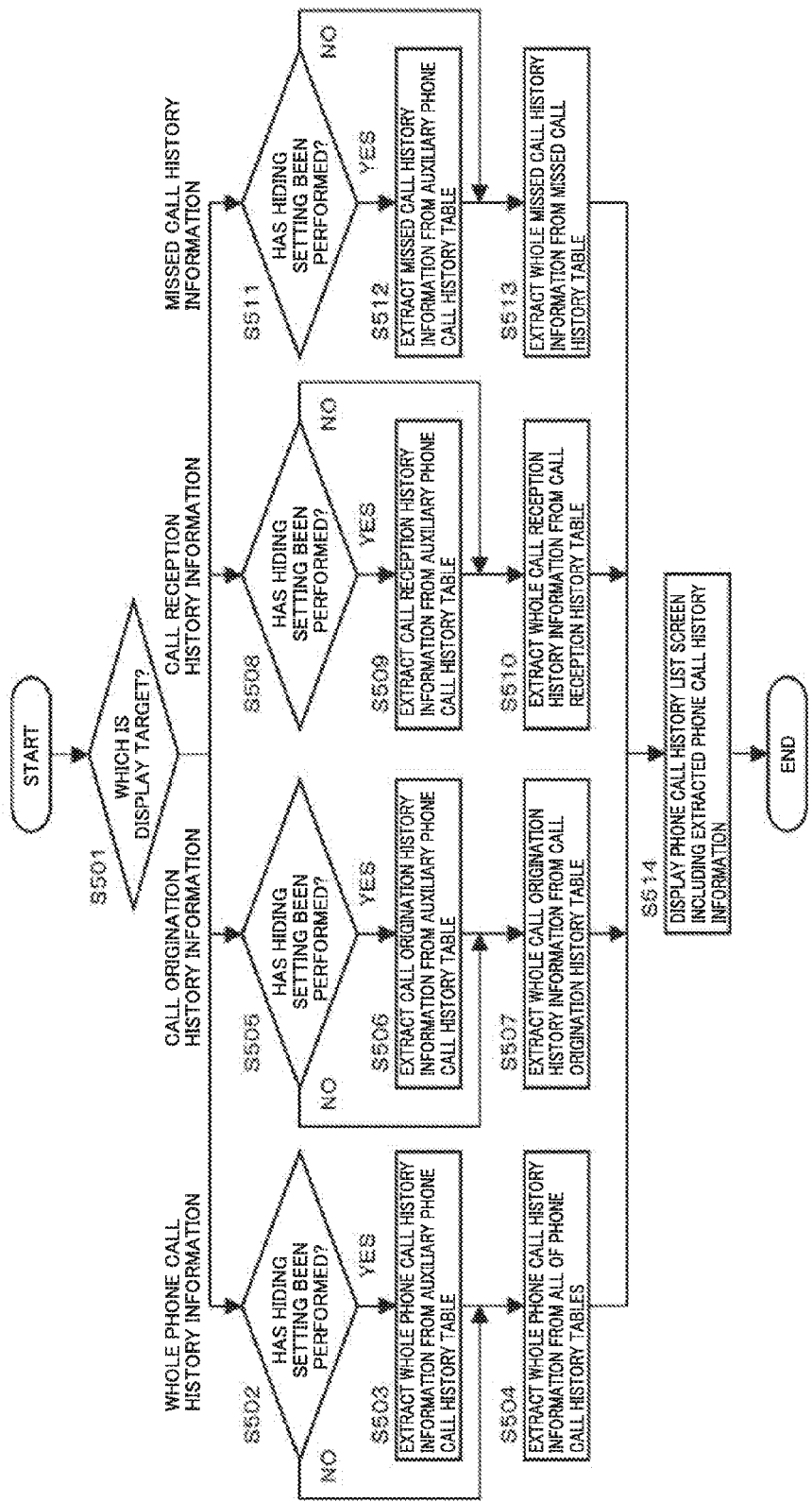

METHOD OF A COMMUNICATION DEVICE FOR CONTROLLING DISPLAY OF CALL HISTORY

CROSS-REFERENCE TO RELATED APPLICATION

The present application is a continuation based on PCT Application No. PCT/JP2014/082966 filed on Dec. 12, 2014, which claims the benefit of Japanese Application No. 2013-257507, filed on Dec. 12, 2013. PCT Application No. PCT/JP2014/082966 is entitled "Communication Device and History Display Control Method", and Japanese Application No. 2013-257507 is entitled "Communication Device, History Display Control Method and Program." The content of which are incorporated by reference herein in their entirety.

FIELD

Embodiments of the present disclosure relate to a communication device which can make communications. Embodiments of the present disclosure also relate to a method of controlling history displaying which is applicable to such a communication device.

BACKGROUND

Conventionally, when a call is originated or received, a portable terminal device, such as a mobile phone, stores call origination history information or call reception history information. The call origination history information includes a telephone number, a call originated date and time, and the like, while the call reception history information includes a telephone number, a call received date and time, and the like (hereinafter, the call origination history information and the call reception history information will be generically called "phone call history information").

A portable terminal device includes a phonebook (address book) in which telephone numbers are registered in association with names. When the phone call history information is displayed on a display, the phonebook is referred to, and together with or instead of a telephone number, an associated name is displayed.

SUMMARY

A first aspect of embodiments of the present disclosure relates to a communication device. The communication device of the first aspect includes a communication unit configured to make a communication with another communication device, a display, an operation unit configured to receive an operation, a memory configured to store a control program, and at least one processor configured to execute a process in accordance with the operation by executing the control program. The memory includes a first storage unit configured to store history information related to the communication and contact information including identification information for identifying the other communication device. The at least one processor is configured to cause the display to display the history information, delete from the first storage unit the contact information selected based on the operation received by the operation unit, and hide the history information on the display when the contact information is to be deleted from the first storage unit, the history information including the identification information included in the contact information to be deleted.

A second aspect of embodiments of the present disclosure relates to a method of displaying history information on a display of a communication device, the history information being related to a communication with another communication device. The method of the second aspect includes determining whether to delete any piece of contact information from a memory, the contact information being stored in the memory and including identification information for identifying another communication device, and hiding the history information on the display, the history information including the identification information included in the contact information to be deleted.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIGS. 1A to 10 show a configuration of a mobile phone according to an embodiment.

FIG. 2 is a block diagram showing an overall configuration of the mobile phone according to an embodiment.

FIG. 3 shows a structure of a phonebook table according to an embodiment.

FIGS. 4A to 4C respectively show structures of a call origination history table, a call reception history table and a missed call history table according to an embodiment.

FIG. 6 is a flowchart showing a history recording process according to an embodiment.

FIG. 8 is a flowchart showing a contact deletion process according to an embodiment.

FIG. 9B shows an example of a confirmation window superimposed on the contact deletion screen according to an embodiment.

FIG. 10 is a flowchart showing a history display process according to an embodiment.

FIG. 12 is a flowchart showing a display target selection process according to an embodiment.

FIGS. 15A to 15C respectively show structures of a call origination history table, a call reception history table and a missed call history table according to a Modification 1.

FIG. 19 shows a structure of an auxiliary phone call history table according to a Modification 2.

FIG. 22 is a flowchart showing a history display process according to Modification 2.

DETAILED DESCRIPTION

Hereinafter, a plurality of embodiments will be described with reference to the drawings. In a portable terminal device, the whole contact information including names and telephone numbers may be deleted from a phonebook by a user's operation. In such a case, in the portable terminal device, no name will be displayed as phone call history information, but a telephone number will be displayed, since there is no contact information corresponding to the telephone number of a destination or a caller. In such a case, the telephone number of a person which is unnecessary for a user whose contact information has been deleted will be displayed along with necessary telephone numbers of missed calls and the like, which may obstruct viewing of the necessary phone call history information by the user.

According to embodiments of the present disclosure, history information related to communications by telephone, e-mail and the like can be displayed appropriately.

Figure 1A:
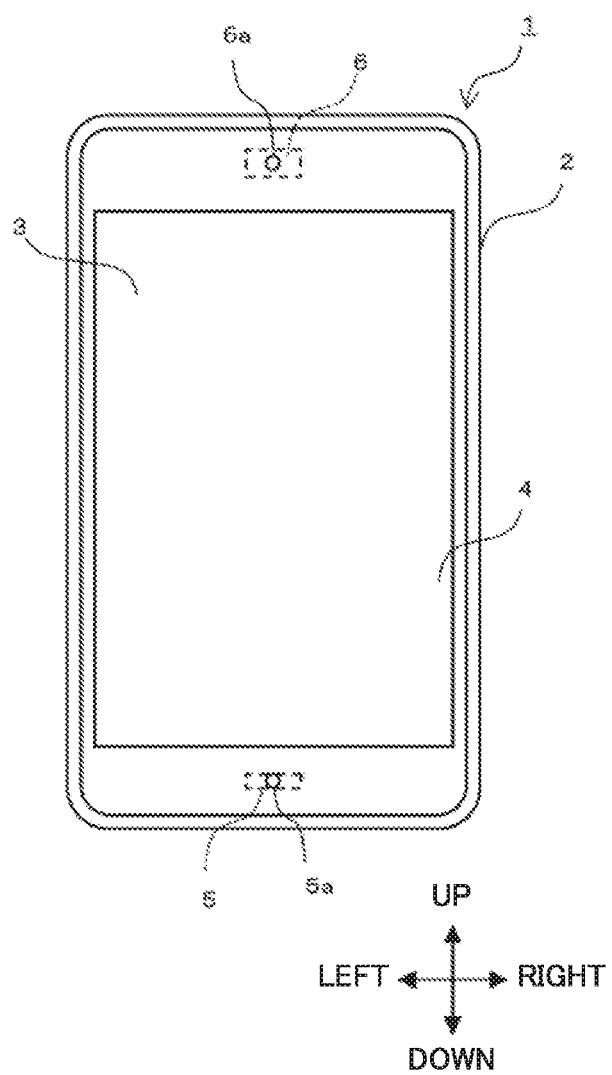
Figure 1C:
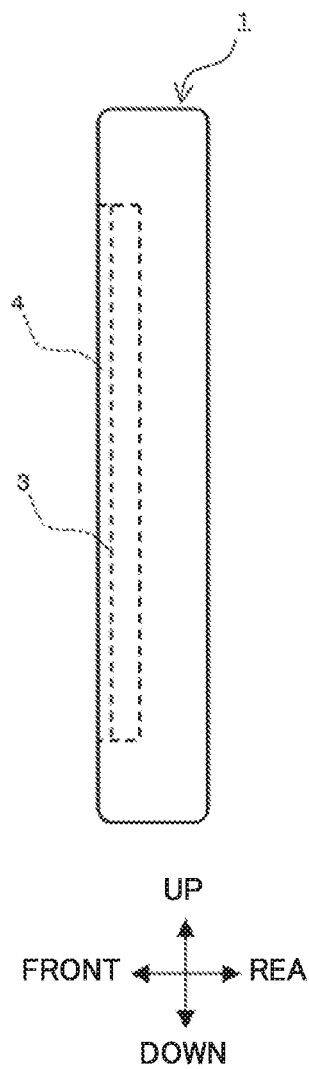

FIGS. 1A to 1C show a front view, a rear view and a right side view of a mobile phone 1, respectively. Hereinafter, as shown in FIGS. 1A to 1C, the longitudinal direction of a cabinet 2 is defined as the up/down direction, and the shorter direction of cabinet 2 is defined as the left/right direction, for ease of description.

As shown in FIGS. 1A to 1C, mobile phone 1 may include cabinet 2, a display 3, a touch panel 4, a microphone 5, a conversation speaker 6, and an external speaker 7.

Cabinet 2 can have a substantially rectangular profile, for example, as seen from the front surface. Display 3 may be located on the front surface side of cabinet 2. Various types of images (screens) may be displayed on display 3. Display 3 includes a liquid crystal display, for example. Display 3 may include a display of another type, such as an organic electroluminescence display. Touch panel 4 may be located to cover display 3. Touch panel 4 may be formed as a transparent sheet. As touch panel 4, various types of touch panels, such as capacitance type, ultrasonic type, pressure-sensitive type, resistive film type, and optical sensing type touch panels, may be used.

Microphone 5 may be located at the lower end within cabinet 2. Conversation speaker 6 may be located at the upper end within cabinet 2. Microphone 5 can receive voice passed through a microphone hole 5a formed in the front surface of cabinet 2. Microphone 5 can generate an electrical signal in accordance with received sound. Conversation speaker 6 can output sound. The output sound may be emitted out of cabinet 2 through an output hole 6a formed in the front surface of cabinet 2. At the time of a call, received voice from a device of a communication partner (mobile phone etc.) may be output through conversation speaker 6, and user's uttered voice may be input to microphone 5. The sound may include various types of sound, such as voice and an audible alert.

External speaker 7 may be located within cabinet 2. An output hole 7a may be formed in the rear surface of cabinet 2 in a region facing external speaker 7. Sound output through external speaker 7 may be emitted out of cabinet 2 through output hole 7a.

Figure 2:
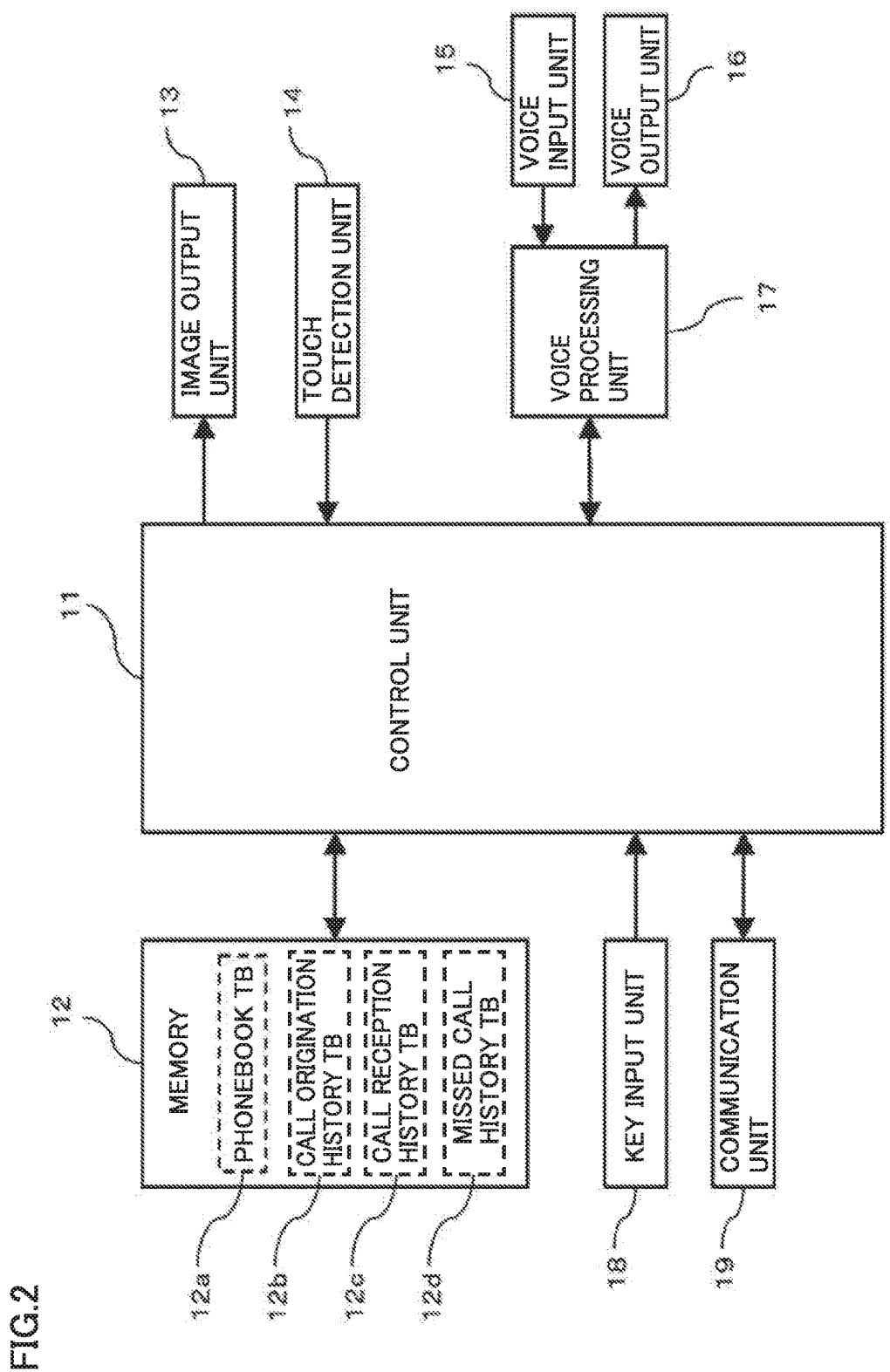

FIG. 2 is a block diagram showing an overall configuration of mobile phone 1.

As shown in FIG. 2, mobile phone 1 may include a control unit 11, a memory 12, an image output unit 13, a touch detection unit 14, a voice input unit 15, a voice output unit 16, a voice processing unit 17, a key input unit 18, and a communication unit 19.

Memory 12 may include a ROM (Read Only Memory), a RAM (Random Access Memory), and an external memory. Memory 12 may have various types of programs stored therein. The programs stored in memory 12 may include various application programs (hereinafter briefly referred to as "applications"), for example, applications for telephone, message, web browser, map, game, schedule management, and the like, in addition to a control program for controlling each unit of mobile phone 1. The programs stored in memory 12 may also include programs for executing a history recording process, a contact deletion process, a history display process, and a display target selection process which will be described later. The programs are stored in memory 12 by a manufacturer during manufacture of mobile phone 1, or may be stored in memory 12 through a communication network or storage medium, such as a memory card or CD-ROM.

Memory 12 may also include a working area for storing data temporarily utilized or generated while a program is executed.

Memory 12 may include a phonebook table 12a. FIG. 3 shows a structure of phonebook table 12a. Contact information on a communications partner may be registered in phonebook table 12a. The contact information may include the name, telephone number, e-mail address, address, and the like. A registration number may be assigned to each piece of contact information.

Memory 12 may have recorded therein history information related to a call, namely, phone call history information. The phone call history information may be divided into call origination history information related to call origination, call reception history information related to call reception, and missed call information related to a missed call. Memory 12 may include a call origination history table 12b, a call reception history table 12c and a missed call history table 12d.

FIGS. 4A, 4B and 4C show structures of call origination history table 12b, call reception history table 12c and missed call history table 12d, respectively.

Call origination history table 12b may have recorded therein call origination history information. The call origination history information may include the telephone number of a destination and the call originated date and time. Call reception history table 12c may have recorded therein call reception history information. The call reception history information may include the telephone number of a caller and the call received date and time. Missed call history table 12d may have recorded therein missed call history information. The missed call history information may include the telephone number of a caller and the call received date and time.

Call origination history table 12b, call reception history table 12c and missed call history table 12d may each include display flags. The display flag may include a flag for making a determination whether or not to display the phone call history information (call origination history information, call reception history information and missed call history information) corresponding to the display flag by a phone call history list screen (which will be described later). Call origination history table 12b, call reception history table 12c and missed call history table 12d may hereinafter be generically called phone call history tables 12b, 12c and 12d.

Control unit 11 may include a CPU (Central Processing Unit). By at least one processor executing a program stored in memory 12, control unit 11 may control each unit constituting mobile phone 1 (memory 12, image output unit 13, touch detection unit 14, voice input unit 15, voice output unit 16, voice processing unit 17, key input unit 18, communication unit 19, and the like).

Image output unit 13 may include display 3 shown in FIG. 1A. Image output unit 13 can cause display 3 to display an image (screen) based on a control signal and an image signal received from control unit 11. Image output unit 13 can turn on, turn off, and adjust brightness of, display 3 in response to control signals received from control unit 11.

Touch detection unit 14 can include touch panel 4 shown in FIG. 1A, and can detect a touch operation on touch panel 4. More specifically, touch detection unit 14 can detect a position (hereinafter referred to as a "touch position") at which a contact object, such as a user's finger, contacts touch panel 4. Touch detection unit 14 can output a position signal generated based on a detected touch position to control unit 11. The touch operation on touch panel 4 is performed on a screen or an object displayed on display 3, and can be rephrased as a touch operation on display 3.

Touch detection unit 14 may be configured to, when a user's finger has approached display 3, namely, touch panel 4, detect a position where the user's finger has approached as a touch position. For example, when touch panel 4 of touch detection unit 14 is of a capacitance type, the sensitivity thereof may be adjusted such that a change in capacitance exceeds a detection threshold value when a finger has approached touch panel 4. When the front surface of cabinet 2 including touch panel 4 is covered with a transparent cover made of glass or the like, a finger is not brought into contact with touch panel 4, but may be brought into contact with the cover. In this case, touch panel 4 can detect a touch position when a finger contacts or approaches the cover.

Because of the presence of touch panel 4, a user can perform various touch operations on display 3 by touching touch panel 4 with his/her finger or bringing his/her finger closer thereto. The touch operation may include a tap operation, a flick operation, a sliding operation, and the like, for example.

For example, when a touch position is no longer detected within a predetermined first time period after touch detection unit 14 detects the touch position, control unit 11 can determine that a tap operation has been performed. In the case where a touch position is moved by a predetermined first distance or more within a predetermined second time period after the touch position is detected, and then the touch position is no longer detected, control unit 11 can determine that a flick operation has been performed. When a touch position is moved by a predetermined second distance or more after the touch position is detected, control unit 11 can determine that a sliding operation has been performed.

Voice input unit 15 may include microphone 5. Voice input unit 15 can output an electrical signal from microphone 5 to voice processing unit 17.

Voice output unit 16 may include conversation speaker 6 and external speaker 7. An electrical signal received from voice processing unit 17 can be input to voice output unit 16. Voice output unit 16 can cause sound to be output through conversation speaker 6 or external speaker 7.

Voice processing unit 17 can perform A/D conversion or the like on an electrical signal received from voice input unit 15, and can output a digital audio signal after conversion to control unit 11. Voice processing unit 17 can perform decoding and D/A conversion or the like on a digital audio signal received from control unit 11, and can output an electrical signal after conversion to voice output unit 16.

Key input unit 18 may include at least one or more hard keys. For example, key input unit 18 may include a power key for turning on mobile phone 1, and the like. Key input unit 18 can output a signal corresponding to a pressed hard key to control unit 11.

Communication unit 19 may include a circuit for converting a signal, an antenna that transmits/receives electric waves, and the like, in order to make calls and communications. Communication unit 19 can convert a signal for a call or communication received from control unit 11 into a radio signal, and can transmit the converted radio signal to a communication destination, such as a base station or another communication device, through the antenna. Communication unit 19 can convert a radio signal received through the antenna into a signal in the form that can be utilized by control unit 11, and can output the converted signal to control unit 11.

Figure 5A:
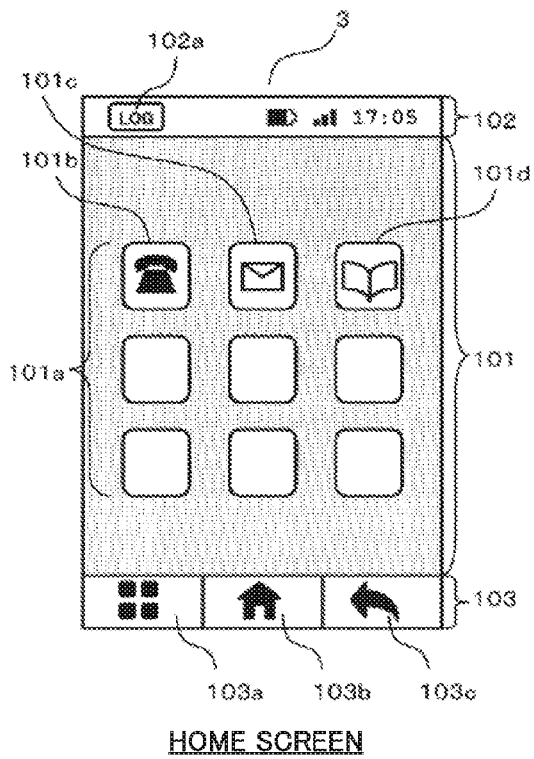
FIGS. 5A to 5C show a display with a home screen, a dial screen and a phone call screen according to an embodiment displayed thereon, respectively.
Figure 5B:
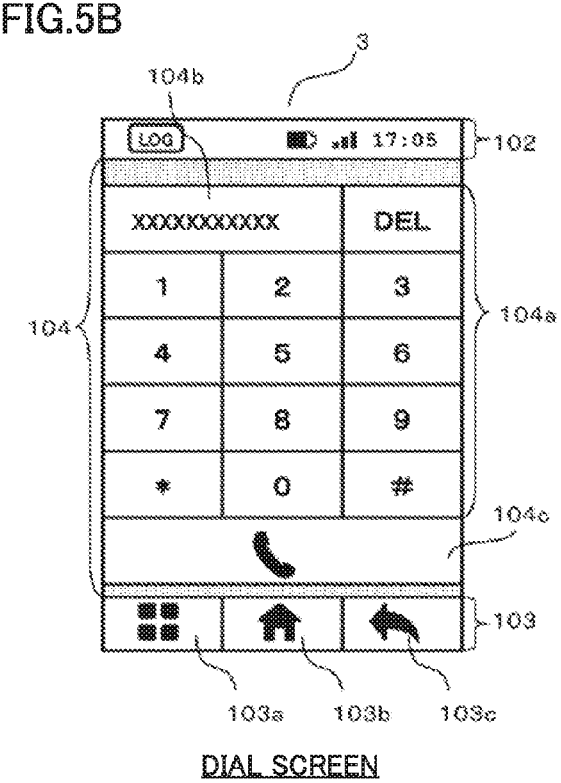
Figure 5C:
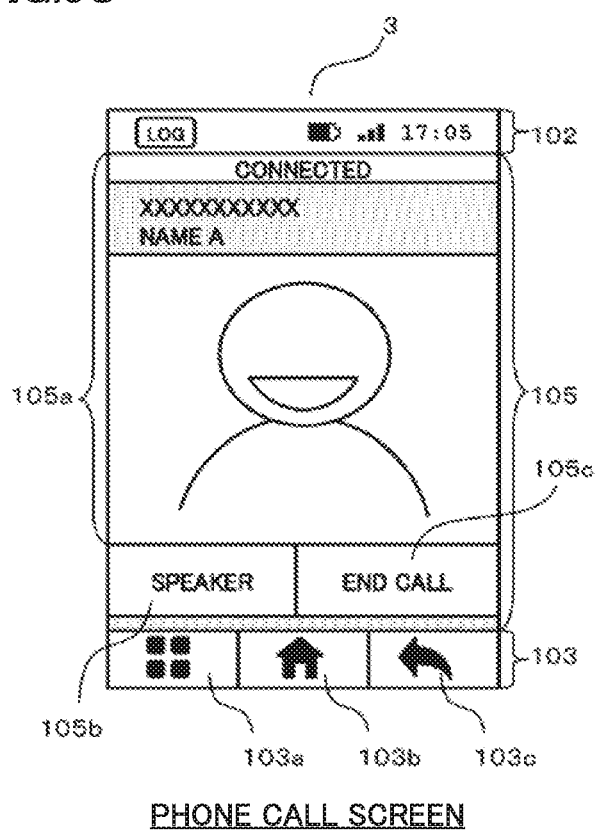

FIGS. 5A, 5B and 5C show display 3 with a home screen 101, a dial screen 104 and a phone call screen 105 displayed thereon, respectively.

In mobile phone 1, home screen 101 may be displayed on display 3 as an initial screen. As shown in FIG. 5A, home screen 101 may include start-up icons 101a for starting up various types of applications. Start-up icons 101a may include a telephone icon 101b, an e-mail icon 101c, a phonebook icon 101d, and the like, for example.

A notification bar 102 and an operation key group 103 may be displayed on display 3 in addition to home screen 101. Notification bar 102 may be displayed above home screen 101 displayed on display 3. Notification bar 102 may include a current time, a capacity meter indicating the battery capacity, a strength meter indicating the strength of electric waves, and the like. Notification bar 102 may include a history display key 102a. History display key 102a may be operated by a user when displaying the phone call history.

Operation key group 103 may be displayed under home screen 101. Operation key group 103 may include a menu key 103a, a home key 103b and a back key 103c. Menu key 103a is a key mainly for causing display 3 to display a menu window including various items. Home key 103b is a key mainly for causing display 3 to shift the display to home screen 101 from another screen. Back key 103c is a key mainly for returning executed processing to processing of an immediately preceding step.

When a touch operation is performed on telephone icon 101b, the telephone application is started up, and dial screen 104 may be displayed on display 3. As shown in FIG. 5B, dial screen 104 may include a numeric keypad 104a, a display window 104b and a call origination key 104c.

When a telephone number is input by a touch operation on numeric keypad 104a, the input telephone number may be displayed in display window 104b. When a touch operation is performed on call origination key 104c, a call may be originated to a telephone set having the input telephone number.

Even when an application is executed and an execution screen based on that application, such as dial screen 104, is displayed, and further, even when the execution screen transitions with the progress of the application, notification bar 102 and operation key group 103 are continuously displayed on display 3.

When there is a response from the telephone set of a destination and a communication path is established so that a call is available, phone call screen 105 may be displayed on display 3. As shown in FIG. 5C, phone call screen 105 may include an information display area 105a, a speaker switch key 105b and a call end key 105c. Information display area 105a may include information on a call partner, such as the telephone number, name and picture of the call partner.

When a touch operation is performed on speaker switch key 105b during a call, the output destination of a received voice may be switched from conversation speaker 6 to external speaker 7. When a touch operation is performed on call end key 105c, the phone call with a call partner may be terminated.

When a call has been received and a predetermined response operation is performed so that a call is available, phone call screen 105 may also be displayed on display 3.

When a call is originated or received, phone call history information may be recorded on mobile phone 1. A history recording process for recording the phone call history information may be executed by control unit 11.

Figure 6:
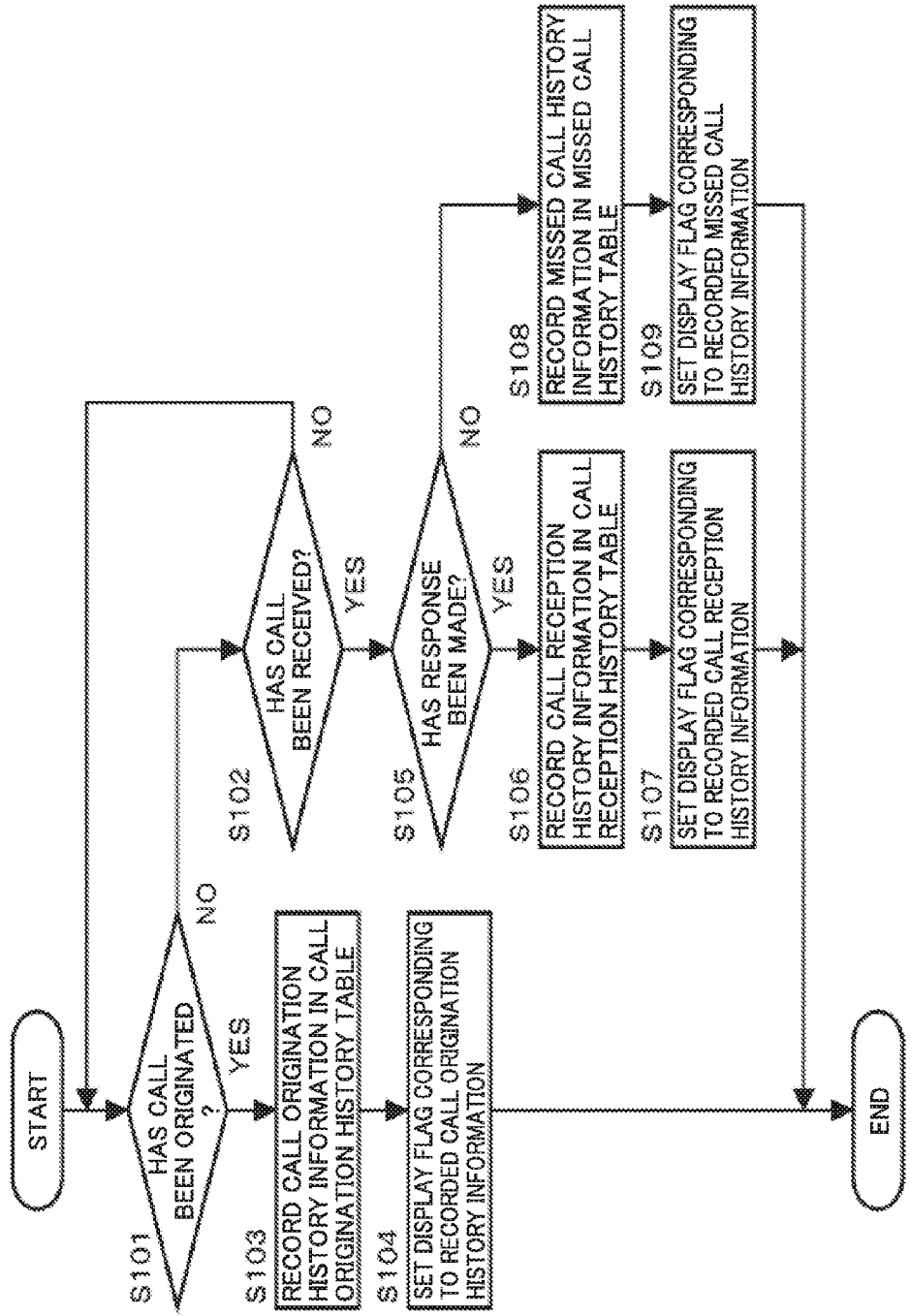

FIG. 6 is a flowchart showing a history recording process.

Control unit 11 can monitor whether or not a call has been originated and whether or not a call has been received (S101, S102). If a call has been originated (YES in S101), control unit 11 can record the telephone number of a destination and the call originated date and time in call origination history table 12b as call origination history information after the termination of the call (S103). Control unit 11 can set a display flag corresponding to the recorded call origination history information (S104).

If a call has been received (YES in S102), control unit 11 can determine whether or not a response has been made to call reception (S105). If a response has been made (YES in S105), control unit 11 can record the telephone number of a caller and the call received date and time in call reception history table 12c as call reception history information (S106). Control unit 11 can set a display flag corresponding to the recorded call reception history information (S107). If a response has not been made (NO in S105), control unit 11 can record the telephone number of a caller and the call received date and time in missed call history table 12d as missed call history information (S108). Control unit 11 can set a display flag corresponding to the recorded missed call history information (S109).

When a touch operation is performed on history display key 102a, for example, the phone call history information recorded in memory 12 may be displayed in a list form on display 3 by a phone call history list screen. Phonebook table 12a is referred to when displaying the phone call history information, and if phonebook table 12a has registered therein the telephone number of a destination or a caller, the name associated with the telephone number may be read from phonebook table 12a and may be displayed on display 3 as phone call history information together with the telephone number.

The whole contact information on any registrant, including the name and telephone number may be deleted from phonebook table 12a. For example, a user can delete from phonebook table 12a the contact information on a person with whom the user does not need to make contact any more.

When the contact information is deleted from phonebook table 12a, the name will no longer be displayed as phone call history information, but the telephone number will be displayed. That is, display of unnecessary phone call history information of a person with whom the user does not need to make contact any more may be left on display 3, which may obstruct viewing of necessary phone call history information by a user.

When contact information on any registrant is deleted, mobile phone 1 of an embodiment ceases displaying the phone call history information including the telephone number included in contact information on a deletion target person (hereinafter referred to as "phone call history information on a deletion target person" for convenience). If display of the phone call history information on a deletion target person is set as a hidden target during a series of operations for deleting contact information as will be described later, the phone call history information on the deletion target person set as a hidden target (for which the display flag has been reset) is no longer included in the phone call history list screen.

When deleting contact information, a user can perform a touch operation on phonebook icon 101d on home screen 101 shown in FIG. 5A to start up a phonebook application. When the phonebook application is started up, a registrant list screen 106 may be displayed on display 3.

Figure 7A:
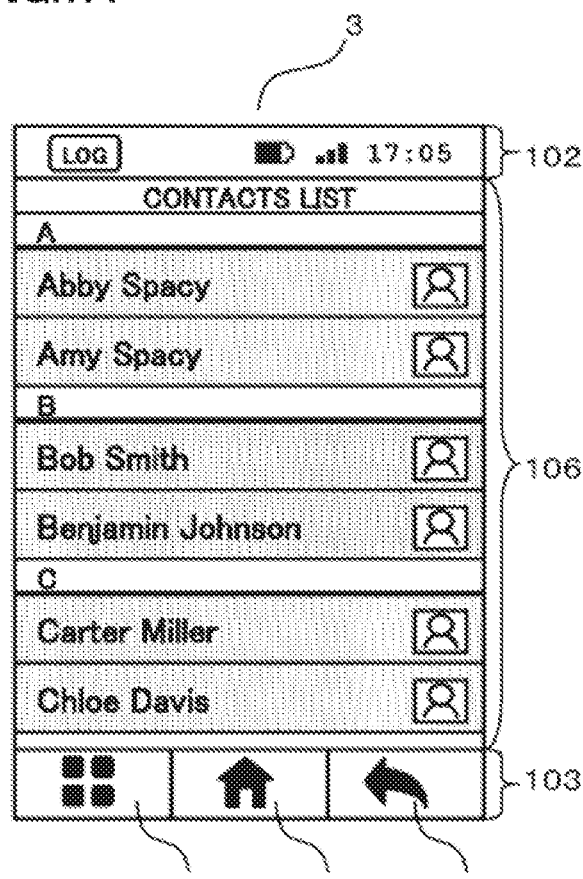
FIG. 7A shows an example of a registrant list screen according to an embodiment.
Figure 7B:
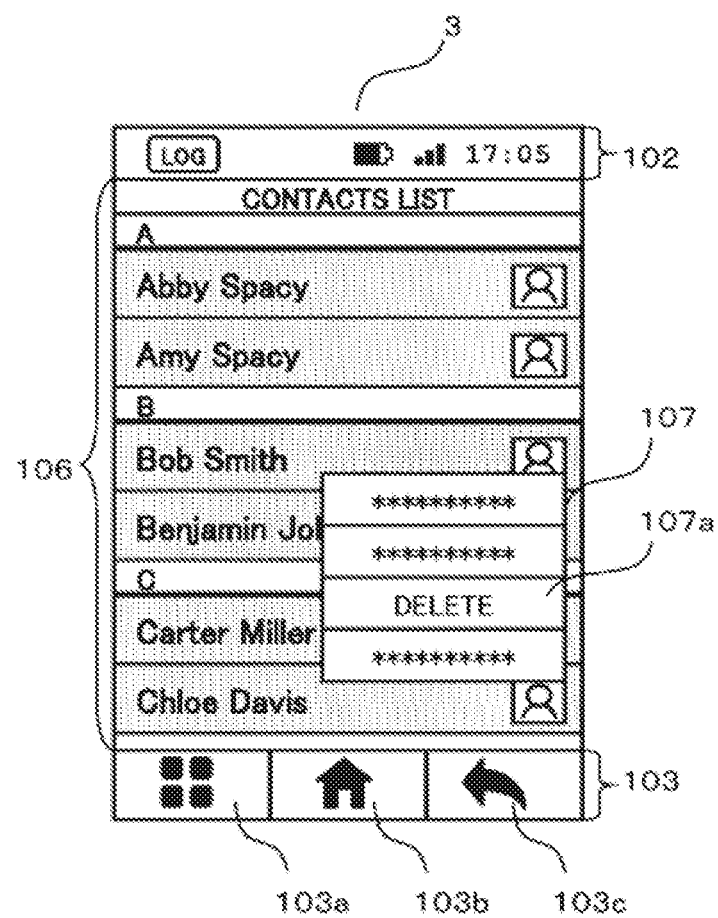
FIG. 7B shows an example of the registrant list screen with a menu window superimposed thereon according to an embodiment.

FIG. 7A shows an example of registrant list screen 106. FIG. 7B shows an example of registrant list screen 106 with a menu window 107 superimposed thereon.

The names of registrants may be listed in the up/down direction on registrant list screen 106. For example, when the names are expressed in English, the respective names may be listed in alphabetical order from the top. Registrant list screen 106 can be scrolled in the up/down direction by a flick operation in the up/down direction.

When a touch operation is performed on menu key 103a with registrant list screen 106 being displayed thereon, menu window 107 may be displayed on display 3 so as to be superimposed on registrant list screen 106. As shown in FIG. 7B, a menu 107a may be included as an item included in menu window 107 for starting a procedure for deleting contact information.

When a touch operation is performed on menu 107a, control unit 11 may start a contact deletion process. Control unit 11 can function as a deletion process unit in the contact deletion process to delete the contact information subjected to the deleting operation from phonebook table 12a. Control unit 11 can function as a hiding process unit in the contact deletion process to reset the display flag corresponding to the phone call history information on a deletion target person, as a process for ceasing displaying the phone call history information on the deletion target person on display 3, and to set the phone call history information as a hidden target.

Figure 8:
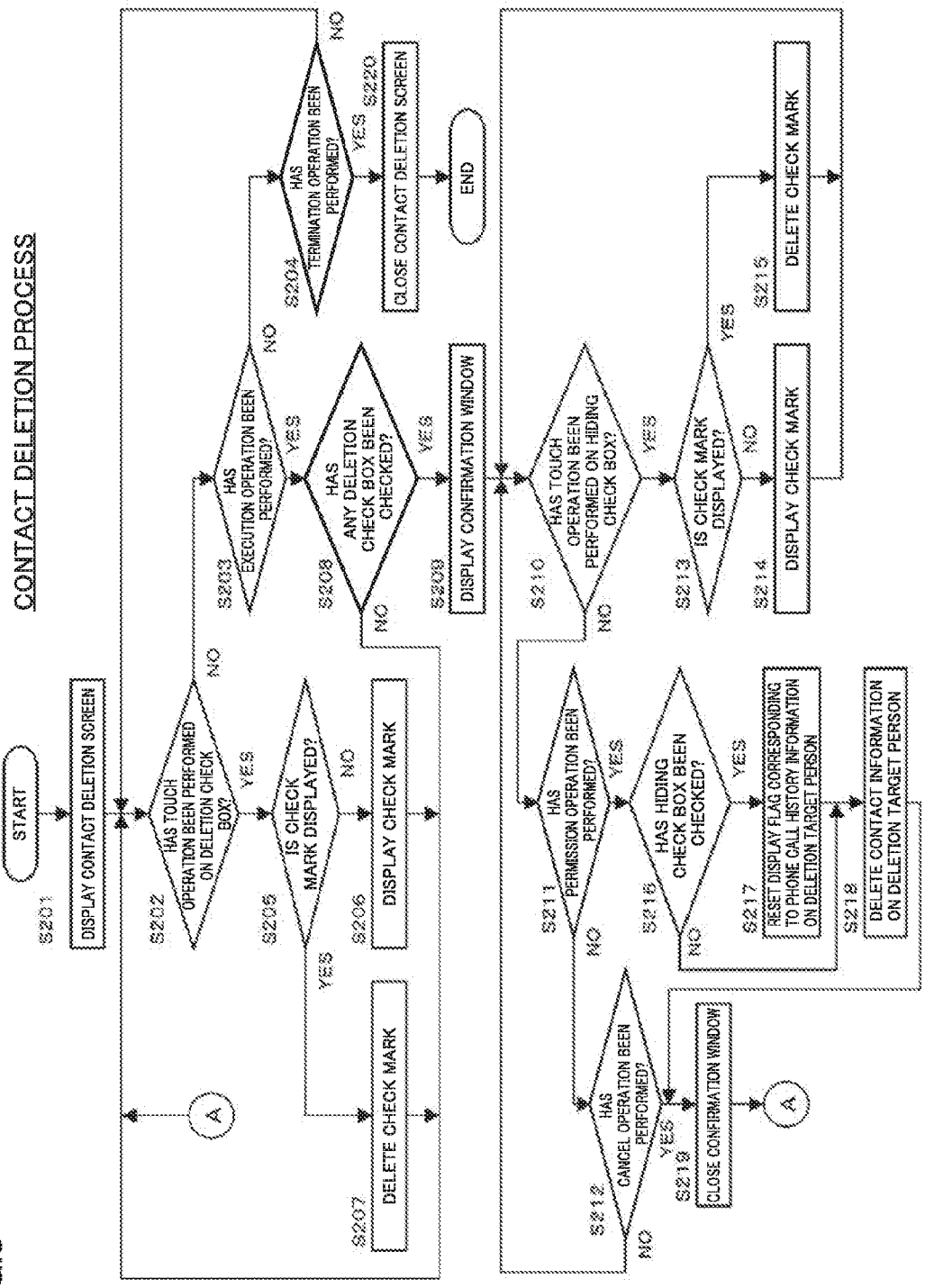
Figure 9A:
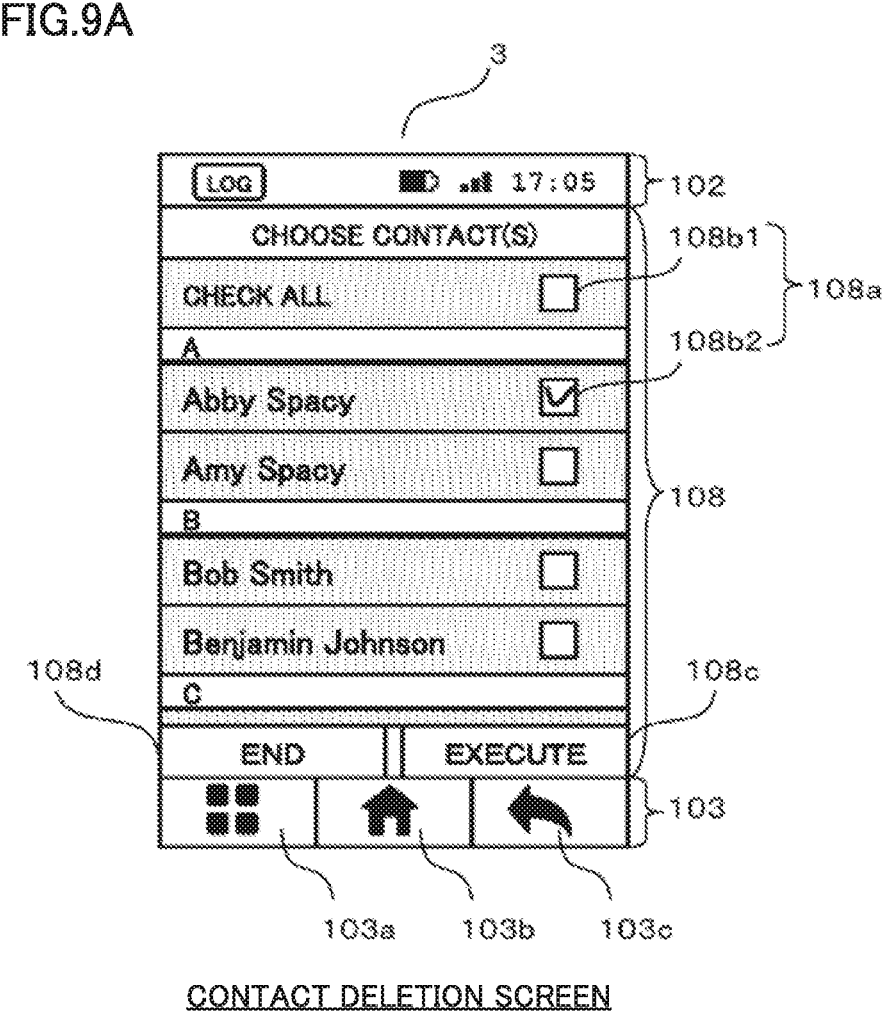
FIG. 9A shows an example of a contact deletion screen according to an embodiment.

FIG. 8 is a flowchart showing a contact deletion process. FIG. 9A shows an example of a contact deletion screen 108. FIG. 9B shows an example of a confirmation window 109 superimposed on contact deletion screen 108.

When the contact deletion process is started, control unit 11 can control image output unit 13 to cause display 3 to display contact deletion screen 108 (S201). As shown in FIG. 9A, contact deletion screen 108 may include a deletion check box 108a for selecting a registrant (deletion target person) whose contact information is to be deleted. Deletion check box 108a may include a first deletion check box 108b1 to be checked when deleting the contact information on all the registrants, and a second deletion check box 108b2 located in correspondence with each registrant and to be checked when deleting the contact information on each registrant. Contact deletion screen 108 may include an execution object 108c used for an execution operation and an end object 108d used for a termination operation. The execution operation may be a touch operation on execution object 108c. The termination operation may be a touch operation on end object 108d. Contact deletion screen 108 can be scrolled in the up/down direction by a flick operation in the up/down direction except for execution object 108c and end object 108d.

Control unit 11 can monitor whether or not a touch operation has been performed on any deletion check box 108a (S202). Control unit 11 can monitor whether or not the execution operation has been performed and whether or not the termination operation has been performed (S203, S204).

A user can perform a touch operation on desired deletion check box 108a. When a touch operation has been performed on any deletion check box 108a (YES in S202), and when a check mark is not displayed in deletion check box 108a (NO in S205), control unit 11 can cause a check mark to be displayed (S206). When a check mark is displayed (YES in S205), control unit 11 can delete the check mark (S207).

A user can perform the execution operation after inputting a check mark in desired deletion check box 108a. When the execution operation is performed with any deletion check box 108a checked (YES in S203 and YES in S208), control unit 11 can cause display 3 to display confirmation window 109 so as to be superimposed on contact deletion screen 108 (S209).

Confirmation window 109 may include a message notifying that the contact information on a registrant corresponding to deletion check box 108a will be deleted. Confirmation window 109 may include a hiding check box 109a for a user to select whether or not to set the phone call history information on a deletion target person as a hidden target. Confirmation window 109 may include a permission object 109b used for a permission operation and a cancel object 109c used for a cancel operation. The permission operation may be a touch operation on permission object 109b. The cancel operation may be a touch operation on cancel object 109c.

Control unit 11 can monitor whether or not a touch operation has been performed on hiding check box 109a (S210). Control unit 11 can monitor whether or not a permission operation has been performed and whether or not a cancel operation has been performed (S211, S212).

When a user does not wish the phone call history information on a deletion target person to be displayed on display 3, he/she can perform a touch operation on hiding check box 109a. When a touch operation has been performed on hiding check box 109a (YES in S210), and when a check mark is not displayed in hiding check box 109a (NO in S213), control unit 11 can cause a check mark to be displayed (S214). When a check mark is displayed (YES in S213), control unit 11 can delete the check mark (S215).

When permitting deletion of the contact information on a deletion target person (when all the registrants have been selected, all the registrants), a user can perform a permission operation. When the permission operation has been made (YES in S211), control unit 11 can determine whether or not hiding check box 109a has been checked (S216). When hiding check box 109a has been checked (YES in S216), control unit 11 accesses phone call history tables 12b, 12c and 12d, and can reset the display flags corresponding to the phone call history information on a deletion target person (call origination history information, call reception history information and missed call history information) in these phone call history tables 12b, 12c and 12d to set the phone call history information as a hidden target (S217). Control unit 11 can delete the contact information on a deletion target person from phonebook table 12a (S218). When hiding check box 109a has not been checked (NO in S216), control unit 11 can delete the contact information on a deletion target person from phonebook table 12a while maintaining the display flags corresponding to the phone call history information on a deletion target person in the set state (S218). Control unit 11 can close confirmation window 109 (S219), can return the process to step S202, and can monitor again whether or not a touch operation has been performed on deletion check box 108a, whether or not an execution operation has been performed, and whether or not a cancel operation has been performed (S202, S203, S204).

When cancelling deletion of the contact information on a deletion target person, a user performs a cancel operation. When a cancel operation has been performed (YES in S212), control unit 11 can stop deletion, can close confirmation window 109 (S219), and can return the process to step S202.

When deletion of the contact information on a deletion target person is completed, a user can perform a termination operation on contact deletion screen 108. When the termination operation has been performed (YES in S204), control unit 11 can close contact deletion screen 108 (S220) to terminate the contact deletion process.

When causing display 3 to display the phone call history information, a user can perform a touch operation on history display key 102a shown in FIG. 5A. The history display process is executed by control unit 11, and a phone call history list screen 110 may be displayed on display 3. In the history display process, control unit 11 can function as a display processing unit of the present disclosure to cause display 3 to display the phone call history information stored in phone call history tables 12b, 12c and 12d. At this time, control unit 11 can cause display 3 to display phone call history information not having been set as a hidden target (for which the display flags have been set) without causing display 3 to display phone call history information having been set as a hidden target (for which the display flags have been reset) in phone call history tables 12b, 12c and 12d.

Figure 11A:
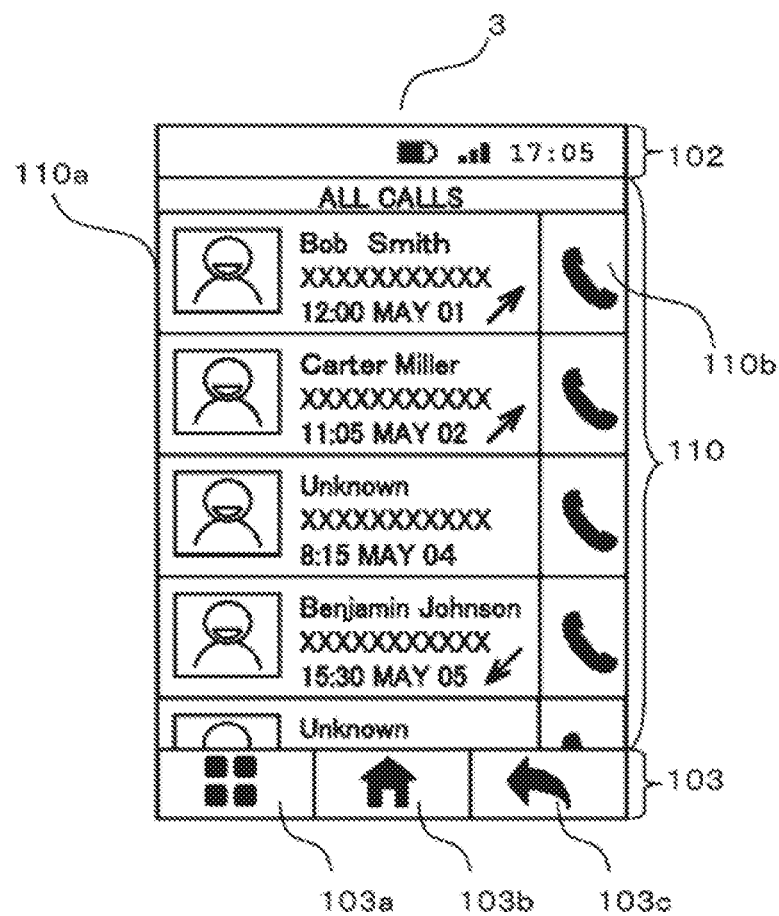
FIG. 11A shows an example of a phone call history list screen in a case where a hiding setting has been made thereon according to an embodiment.
Figure 11B:
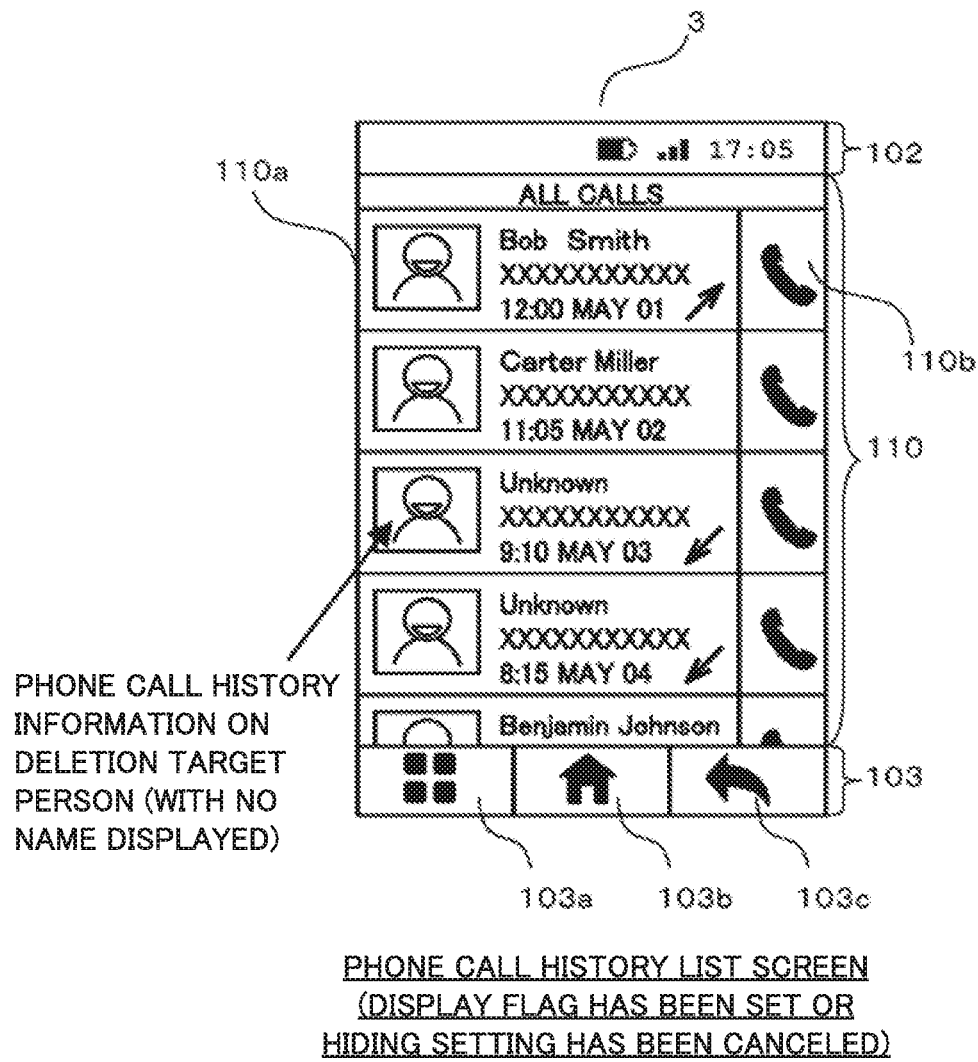
FIG. 11B shows an example of the phone call history list screen in a case where the hiding setting has not been made thereon according to an embodiment.

FIG. 10 is a flowchart showing a history display process. FIG. 11A shows an example of phone call history list screen 110 in a case where a hiding setting has been made thereon. FIG. 11B shows an example of phone call history list screen 110 in a case where the hiding setting has not been made thereon.

When the history display process is started, control unit 11 can determine which of the whole phone call history information, call origination history information, call reception history information, and missed call history information is set as a display target on phone call history list screen 110 (S301). The display target on phone call history list screen 110 may be set based on a user's selection operation in the display target selection process which will be described later.

When the whole phone call history information has been set as the display target (S301: whole phone call history information), control unit 11 can determine whether or not the hiding setting has been performed (S302). The hiding setting may include a setting for hiding the phone call history information having been set as a hidden target in the above-described contact deletion process. The hiding setting may be performed based on a user's selection operation in the display target selection process which will be described later.

When the hiding setting has been made (YES in S302), control unit 11 can extract the phone call history information for which display flags have been set from all of phone call history tables 12b, 12c and 12d (S303). Control unit 11 extracts phone call history information not having been set as a hidden target, and does not extract phone call history information having been set as a hidden target. When the hiding setting has not been made (NO in S302), control unit 11 can extract the whole phone call history information from all of phone call history tables 12b, 12c and 12d (S304).

Similarly, when the call origination history information has been set as the display target (S301: call origination history information), and when the hiding setting has been made (YES in S305), control unit 11 can extract call origination history information for which a display flag has been set from call origination history table 12b (S306). When the hiding setting has not been made (NO in S305), control unit 11 can extract the whole call origination history information from call origination history table 12b (S307). When the call reception history information has been set as the display target (S301: call reception history information), and when the hiding setting has been made (YES in S308), control unit 11 can extract the call reception history information for which a display flag has been set from call reception history table 12c (S309). When the hiding setting has not been made (NO in S308), control unit 11 can extract the whole call reception history information from call reception history table 12c (S310). When the missed call history information has been set as the display target (S301: missed call history information), and when the hiding setting has been made (YES in S311), control unit 11 can extract the missed call history information for which a display flag has been set from missed call history table 12d (S312). When the hiding setting has not been made (NO in S311), control unit 11 can extract the whole missed call history information from missed call history table 12d (S313).

When the phone call history information (the whole phone call history information, call origination history information, call reception history information, or missed call history information) has been extracted, control unit 11 can control image output unit 13 to cause display 3 to display phone call history list screen 110 including a list of the extracted phone call history information (S314). As shown in FIG. 11A, the phone call history information on a deletion target person, when set as a hidden target (for which the display flag has been reset) and the hiding setting has been made, is not displayed on phone call history list screen 110. As shown in FIG. 11B, the phone call history information on a deletion target person may be displayed on phone call history list screen 110, when not set as a hidden target (for which the display flag has not been reset) or when the hiding setting has not been performed even if it has been set as a hidden target. Since the contact information has been deleted, control unit 11 cannot read the name corresponding to a telephone number from phonebook table 12a. Thus, the name is no longer displayed. FIGS. 11A and 11B illustrate phone call history list screen 110 when the whole phone call history information has been set as a display target.

Phone call history list screen 110 may include a telephone number and the call originated (received) date and time as the phone call history information. Phone call history list screen 110 may include the name associated with the telephone number in phonebook table 12a. Phone call history list screen 110 may indicate the type of a call, i.e., whether an originated call or a received call, by the direction of an arrow. For a missed call, no arrow is displayed. On phone call history list screen 110, a call origination object 110b is prepared in correspondence to each information column 110a in which phone call history information is presented. When a touch operation is performed on call origination object 110b, control unit 11 can originate a call to the telephone number corresponding to operated call origination object 110b.

The display target selection process for performing selection of a display target and a hiding setting will now be described. Control unit 11 can function as a setting processing unit of the present disclosure in the display target selection process, and can perform a hiding setting for causing display 3 not to display the phone call history information having been set as a hidden target.

Figure 13A:
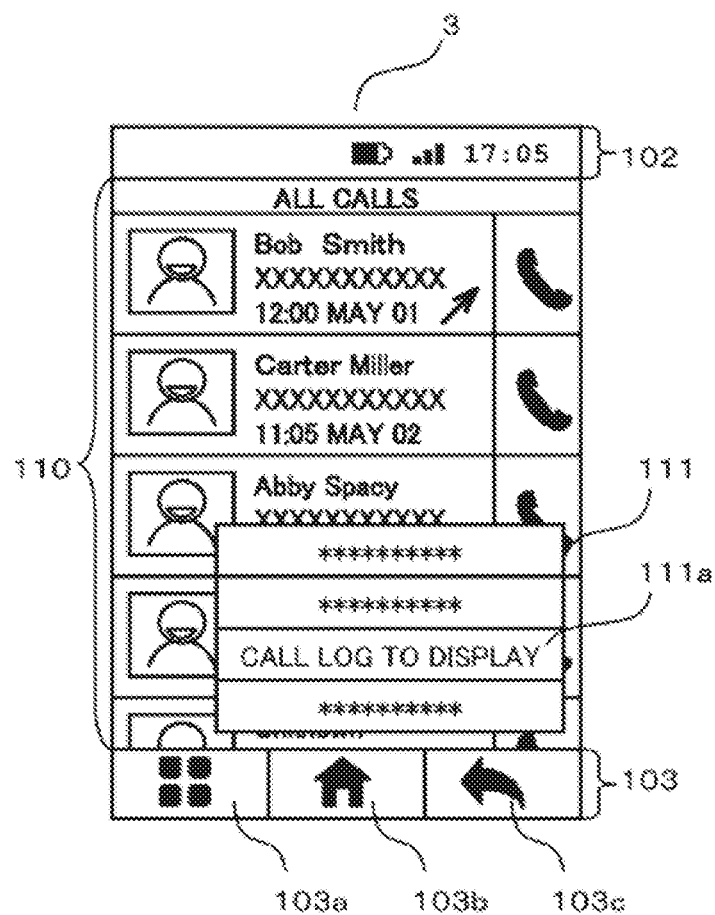
FIG. 13A shows an example of the phone call history list screen with a menu window superimposed thereon according to an embodiment.
Figure 13B:
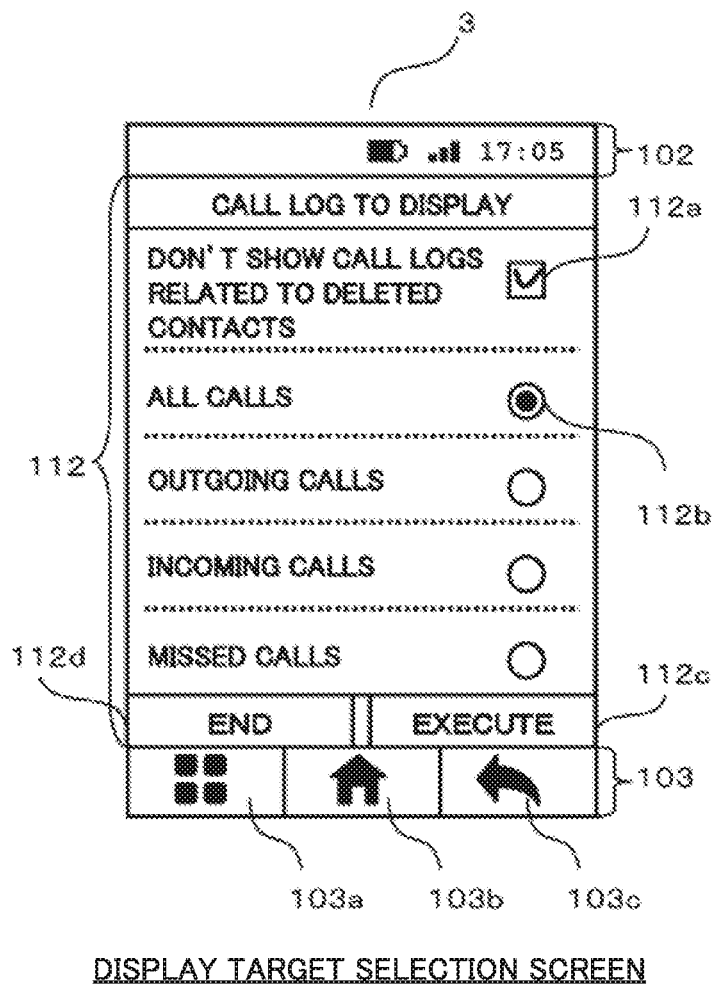
FIG. 13B shows an example of a display target selection screen according to an embodiment.

FIG. 12 is a flowchart showing a display target selection process. FIG. 13A shows an example of phone call history list screen 110 with a menu window 111 superimposed thereon. FIG. 13B shows an example of a display target selection screen 112.

When selecting phone call history information to be a display target or performing a hiding setting, a user can perform a touch operation on menu key 103a with phone call history list screen 110 being displayed. Menu window 111 may be displayed on display 3 so as to be superimposed on phone call history list screen 110. As shown in FIG. 13A, a menu 111a for starting the procedure for selecting a display target may be included as an item included in menu window 111. When a user performs a touch operation on menu 111a, the display target selection process may be started by control unit 11.

Referring to FIG. 12, control unit 11 can control image output unit 13 to cause display 3 to display target selection screen 112 (S401). As shown in FIG. 13B, display target selection screen 112 may include a setting check box 112a to be checked when hiding phone call history information which is a hidden target and a selection check box 112b for selecting the phone call history information to be a display target. Selection check box 112b may be prepared in correspondence to each item of "the whole phone call history information", "call origination history information", "call reception history information", and "missed call history information." Display target selection screen 112 may include an execution object 112c used for an execution operation and an end object 112d used for a termination operation. The execution operation may be a touch operation on execution object 112c. The termination operation may be a touch operation on end object 112d.

Control unit 11 can monitor whether or not a touch operation has been performed on setting check box 112a (S402). For hiding the phone call history information which is a hidden target, a user can perform a touch operation on setting check box 112a having no check mark therein. When a touch operation has been performed on setting check box 112a (YES in S402), and when no check mark is displayed in setting check box 112a (NO in S403), control unit 11 can cause a check mark to be displayed (S404). When a check mark is displayed (YES in S403), control unit 11 can delete the check mark (S405).

Control unit 11 can monitor whether or not a touch operation has been performed on selection check box 112b (S406). A user can perform a touch operation on selection check box 112b corresponding to an item he/she wishes to be displayed. When a touch operation has been performed on any selection check box 112b (YES in S406), control unit 11 can cause a check mark to be displayed in selection check box 112b on which the touch operation has been performed (S407). At this time, a check mark in another selection check box 112b having been displayed so far may be deleted.

Control unit 11 can monitor whether or not the execution operation has been performed and whether or not the termination operation has been performed (S408, S409). When a user inputs a check mark in setting check box 112a (or inputs no check mark), and further inputs a check mark in desired selection check box 112b, he/she can perform the execution operation.

If the execution operation has been performed (YES in S408), control unit 11 can determine whether or not setting check box 112a has been checked (S410). If setting check box 112a has been checked (YES in S410), control unit 11 can perform the hiding setting of hiding the phone call history information which is a hidden target (S411). Control unit 11 can set the phone call history information selected by the check in selection check box 112b as a display target to be displayed on phone call history list screen 110 (S412). Control unit 11 can close display target selection screen 112 (S413) to terminate the display target selection process. Also when the termination operation is performed on display target selection screen 112 (YES in S409), control unit 11 can close display target selection screen 112 (S413) to terminate the display target selection process.

After the display target selection process is terminated, the history display process may be performed again, and phone call history list screen 110 may be displayed on display 3. In this display, the hiding setting and the setting of a display target performed previously in the display target selection process become effective. When the display target selection process is terminated, the screen may be returned to home screen 101.

Figure 14:
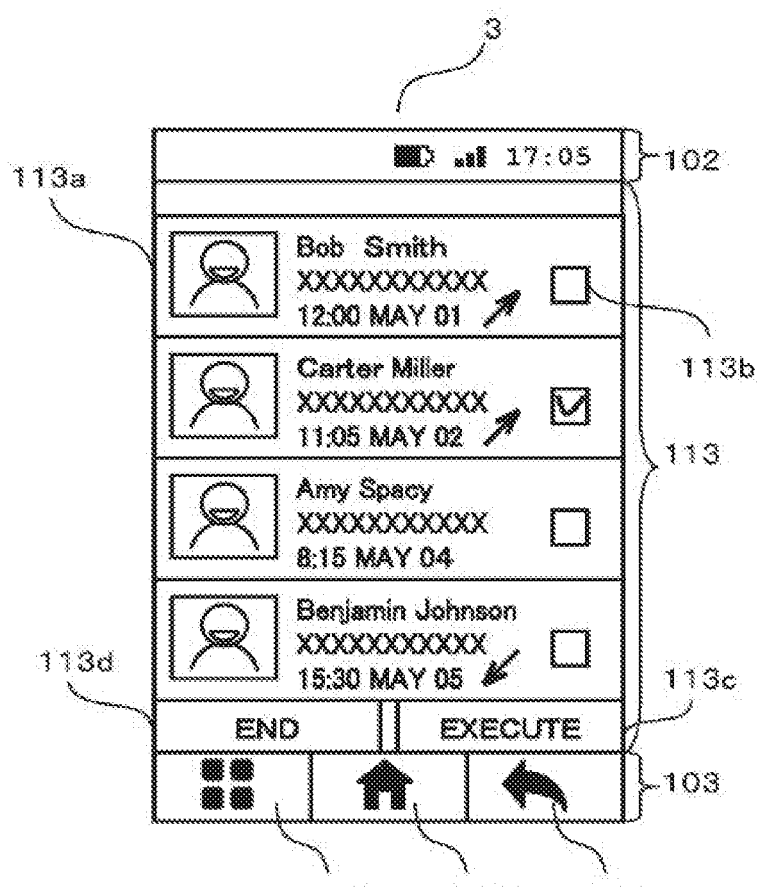
FIG. 14 shows an example of a hidden target cancel screen according to an embodiment.

A user can cancel the setting using a hidden target cancel screen 113 about the phone call history information having been set as a hidden target. FIG. 14 shows an example of hidden target cancel screen 113. On hidden target cancel screen 113, a cancel check box 113b may be prepared in correspondence to each information column 113a in which the phone call history information which is a hidden target is presented. An execution object 113c and a termination object 113d may be prepared on hidden target cancel screen 113.

When a user performs a touch operation on cancel check box 113b for phone call history information that he/she wishes to cancel, control unit 11 can cause a check mark to be displayed in cancel check box 113b. When a touch operation is performed on execution object 113c as the execution operation, control unit 11 can cancel the setting as a hidden target for the phone call history information by setting the display flag for the checked phone call history information.

According to an embodiment as described above, when deleting contact information, a user can prevent display 3 from displaying the phone call history information including the telephone number included in the deleted contact information. Unnecessary phone call history information can be easily prevented from being displayed continuously on display 3. If the phone call history information displayed on display 3 does not include a name, a user can easily recognize that it is a call with a person who has not been registered in phonebook table 12a. The user clearly distinguishes between a call with a person who has not been registered in the phonebook and a call with a person whose registration has been deleted from the phonebook.

According to an embodiment, a user can select whether or not to hide the phone call history information relevant to the contact information for each piece of deleted contact information, which is convenient for the user.

According to an embodiment, a user can determine whether or not to display the whole phone call history information having been set as a hidden target, which is more convenient for the user.

Although an embodiment of the present disclosure has been described above, the contents of the present disclosure are not at all restricted by the above-described embodiment or the like, and various modifications can be made to embodiments of the present disclosure in addition to the foregoing.

<Modification 1>

In the above-described embodiment, when hiding check box 109a on confirmation window 109 is checked in the operation of deleting contact information, the phone call history information on a deletion target person is set as a hidden target in phone call history tables 12b, 12c and 12d, and that phone call history information is no longer displayed on phone call history list screen 110.

The above configuration is not a limitation, but a configuration in which when hiding check box 109a on confirmation window 109 is checked, the phone call history information on a deletion target person is deleted from phone call history tables 12b, 12c and 12d may be employed.

FIGS. 15A to 15C respectively show structures of call origination history table 12b, call reception history table 12c and missed call history table 12d according to Modification 1. In Modification 1, there is no display flag prepared for call origination history table 12b, call reception history table 12c and missed call history table 12d.

Figure 16:
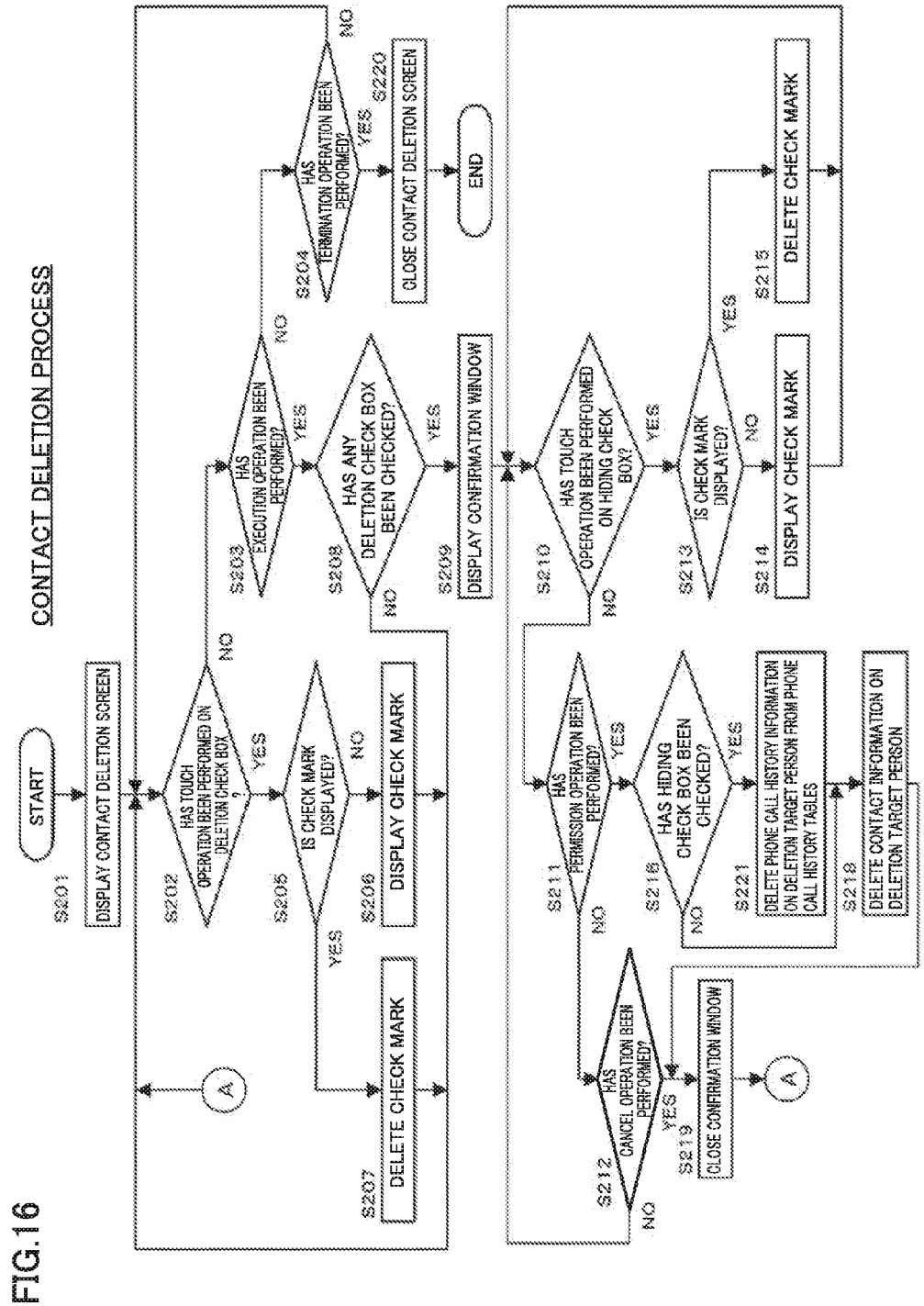
FIG. 16 is a flowchart showing a contact deletion process according to Modification 1.

FIG. 16 is a flowchart showing a contact deletion process according to Modification 1. In Modification 1, step S217 shown in FIG. 8 is replaced by step S221. In Modification 1, when it is determined that hiding check box 109a has been checked (YES in S216), control unit 11 can delete the phone call history information on a deletion target person from phone call history tables 12b, 12c and 12d (S221).

Figure 17A:
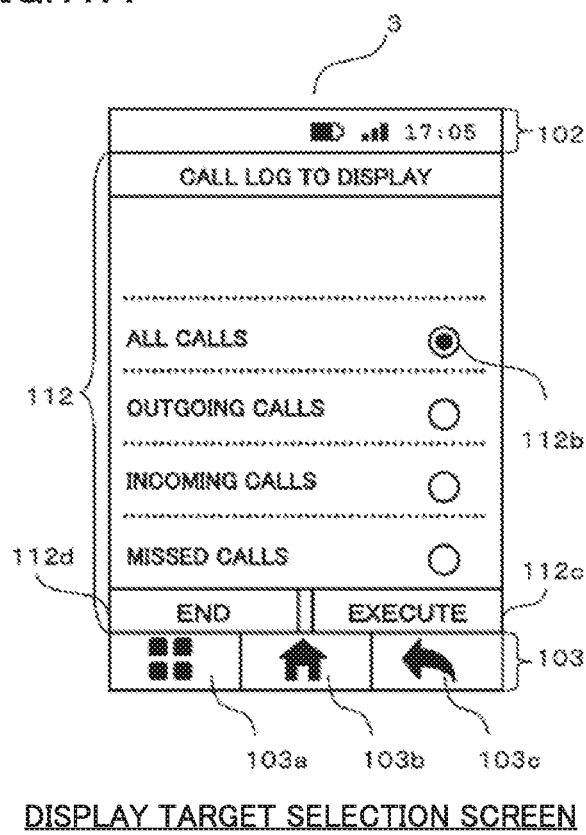
FIG. 17A shows an example of a display target selection screen according to Modification 1.
Figure 17B:
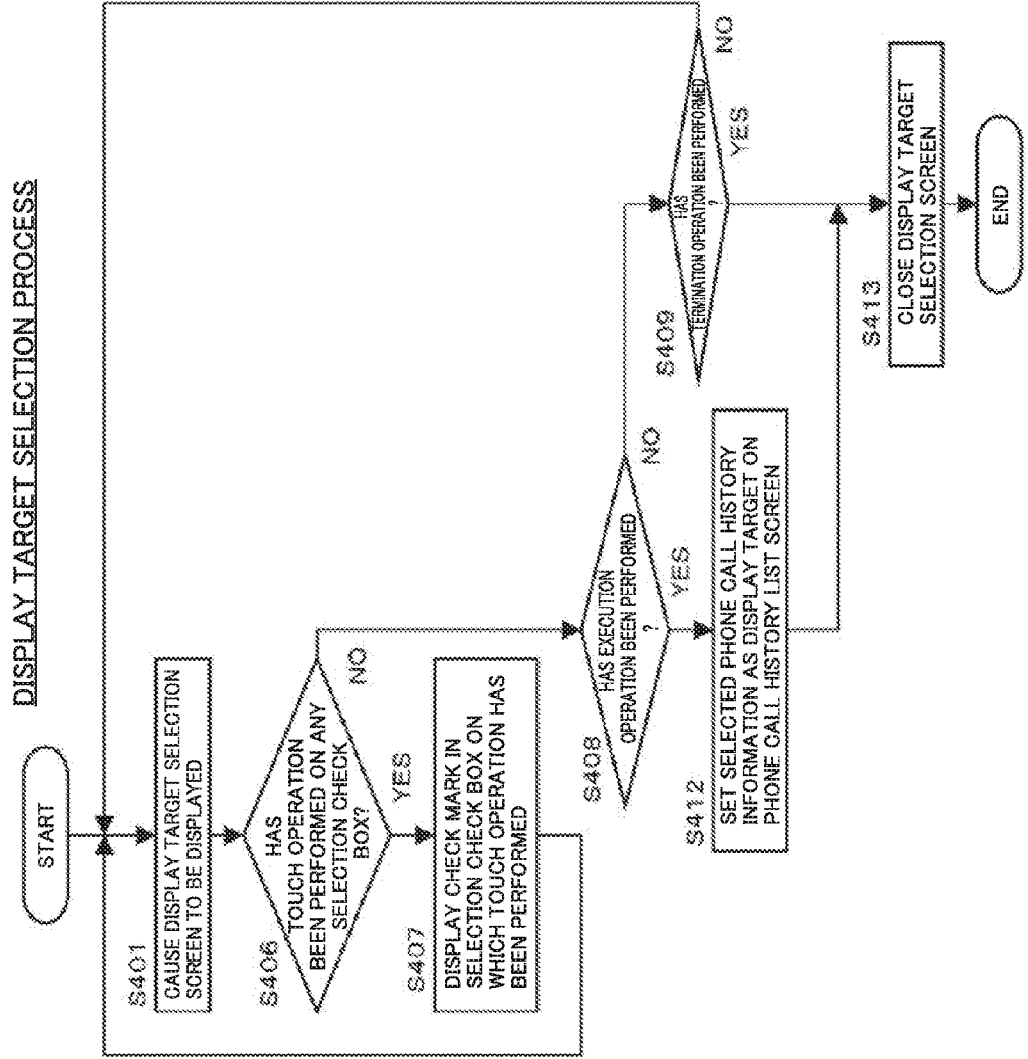
FIG. 17B is a flowchart showing a display target selection process according to Modification 1.

FIG. 17A shows an example of display target selection screen 112 according to Modification 1. FIG. 17B is a flowchart showing a display target selection process according to Modification 1.

Since the phone call history information on a deletion target person is deleted from phone call history tables 12b, 12c and 12d in Modification 1, the hiding setting is not performed in the display target selection process. As shown in FIG. 17A, setting check box 112a may be removed from display target selection screen 112. As shown in FIG. 17B, in the display target selection process, processing related to the hiding setting, namely, steps S402 to S405, S410 and S411 are deleted.

Figure 18:
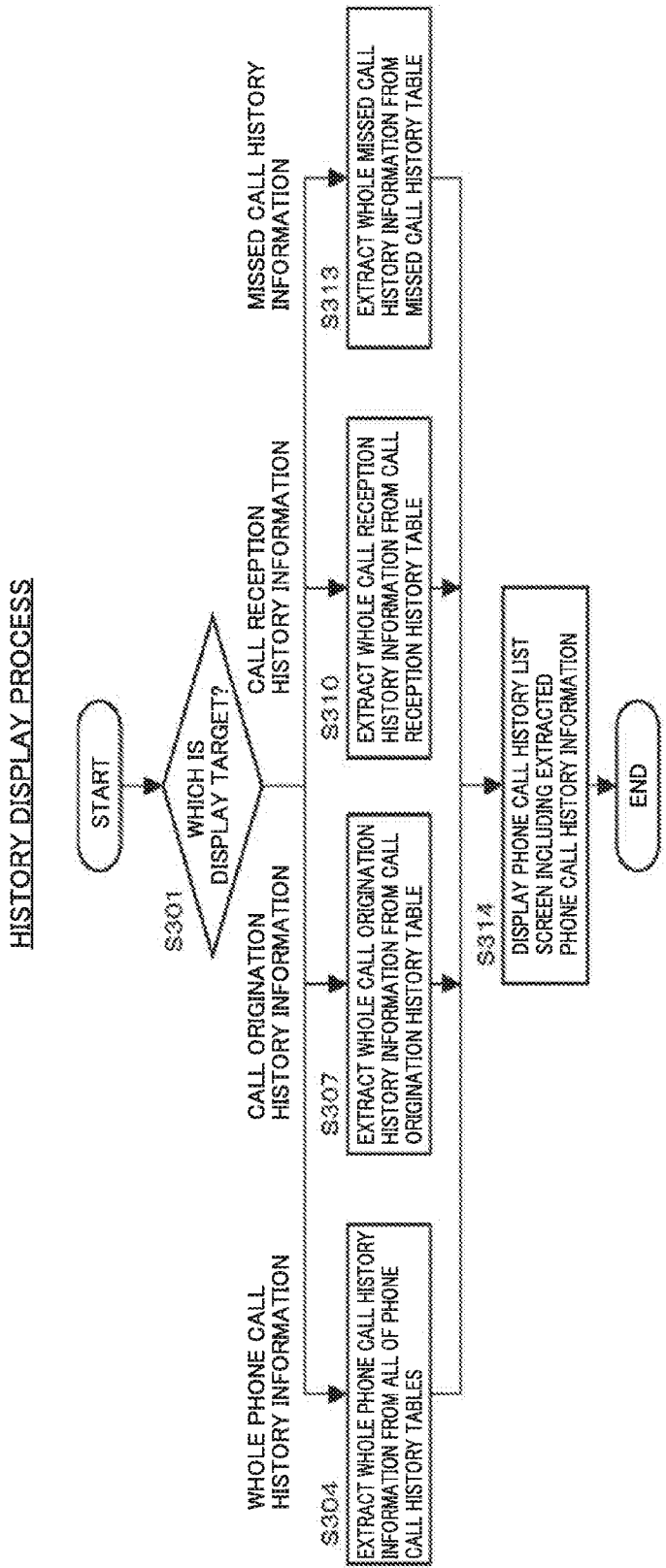
FIG. 18 is a flowchart showing a history display process according to Modification 1.

FIG. 18 is a flowchart showing a history display process according to Modification 1. Since the setting of display flags and the hiding setting are not performed in Modification 1 as described above, steps S302, S303, S305, S306, S308, S309, S311, and S312 are deleted from the history display process. Control unit 11 can extract the whole recorded phone call history information from all or any of phone call history table 12b, 12c and 12d depending on the setting of a display target (S304, S307, S310, S313), and can cause display 3 to display phone call history list screen 110 including the extracted phone call history information (S314). Since the phone call history information on a deletion target person has already been deleted from phone call history tables 12*b*, 12*c* and 12*d*, it will not be displayed on phone call history list screen 110.

According to Modification 1, similarly to the above-described embodiment, a user can also prevent the phone call history information including the telephone number included in the deleted contact information from being displayed on display 3 when deleting the contact information. Unnecessary phone call history information can be easily prevented from being displayed continuously on display 3. For each piece of deleted contact information, a user can select whether or not to hide the phone call history information related to that piece of contact information, which is convenient for the user.

In phone call history tables 12*b*, 12*c* and 12*d*, when the amount of data to be stored reaches an allowable amount of data, old phone call history information will be deleted when new phone call history information is stored. Since the phone call history information on a deletion target person is deleted from phone call history tables 12*b*, 12*c* and 12*d* with the structure of Modification 1, necessary phone call history information can be left in phone call history tables 12*b*, 12*c* and 12*d* for a long period of time.

<Modification 2>

In Modification 1 described above, the phone call history information on a deletion target person is deleted from phone call history tables 12*b*, 12*c* and 12*d*. According to Modification 2, memory 12 includes an auxiliary phone call history table 12*e* separately from phone call history tables 12*b*, 12*c* and 12*d*. Before being deleted from phone call history tables 12*b*, 12*c* and 12*d*, phone call history information is stored in auxiliary phone call history table 12*e*. The phone call history information is moved from phone call history tables 12*b*, 12*c* and 12*d* to auxiliary phone call history table 12*e*.

FIG. 19 shows a structure of auxiliary phone call history table 12*e* according to Modification 2. In addition to phone call history information, auxiliary phone call history table 12*e* stores the type of that phone call history information (originated, received or missed). Rather than storing the type in this way, an auxiliary phone call history table may be independently prepared for each of call origination history information, call reception history information and missed call history information.

Figure 20:
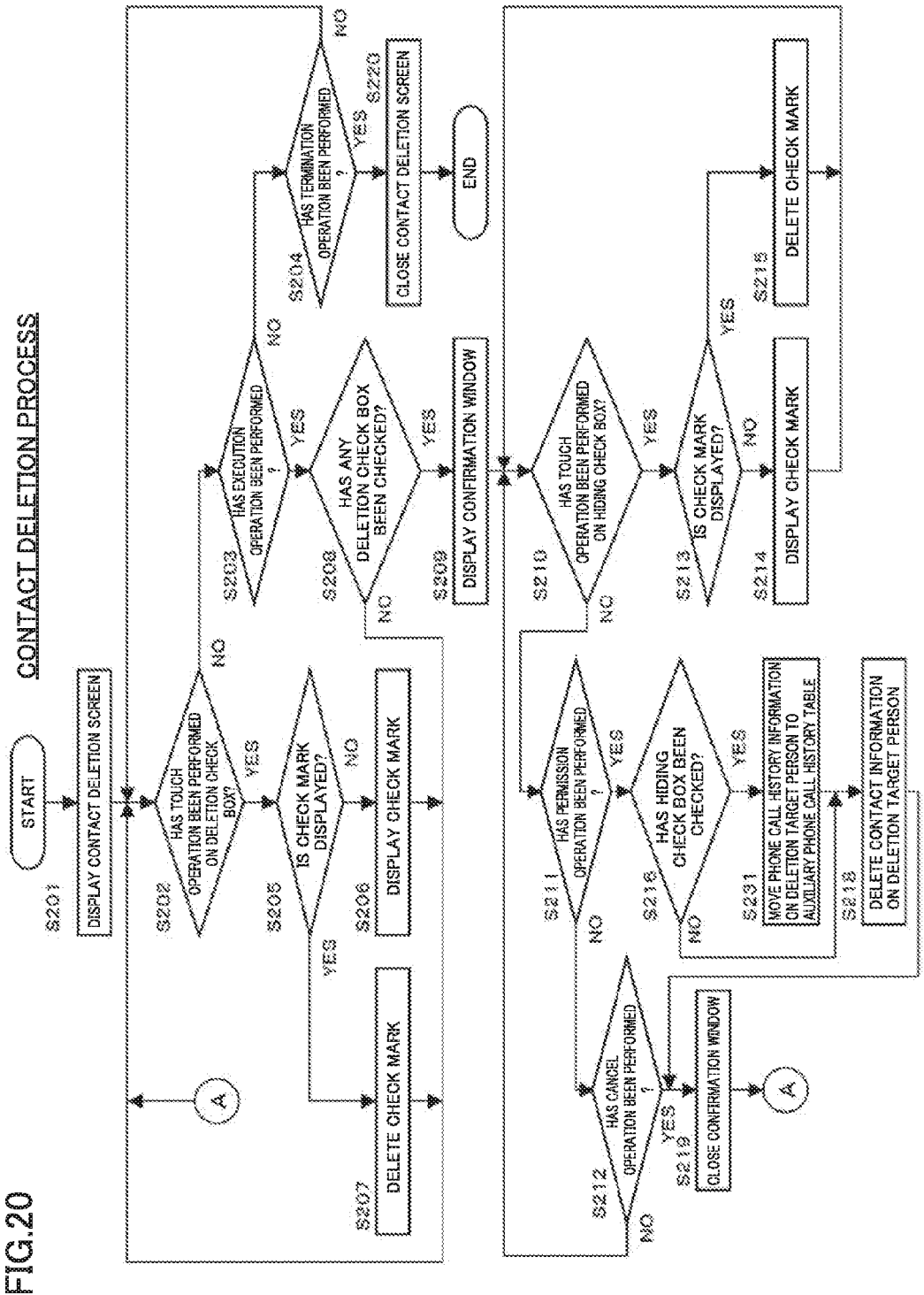
FIG. 20 is a flowchart showing a contact deletion process according to Modification 2.

FIG. 20 is a flowchart showing a contact deletion process according to Modification 2. In Modification 2, step S217 shown in FIG. 8 is replaced by step S231. In Modification 2, when it is determined that hiding check box 109*a* has been checked (YES in S216), control unit 11 can move the phone call history information on a deletion target person from phone call history tables 12*b*, 12*c* and 12*d* to auxiliary phone call history table 12*e* (S231). Control unit 11 can delete the phone call history information on a deletion target person from phone call history tables 12*b*, 12*c* and 12*d* after storage in auxiliary phone call history table 12*e*.

Figure 21:
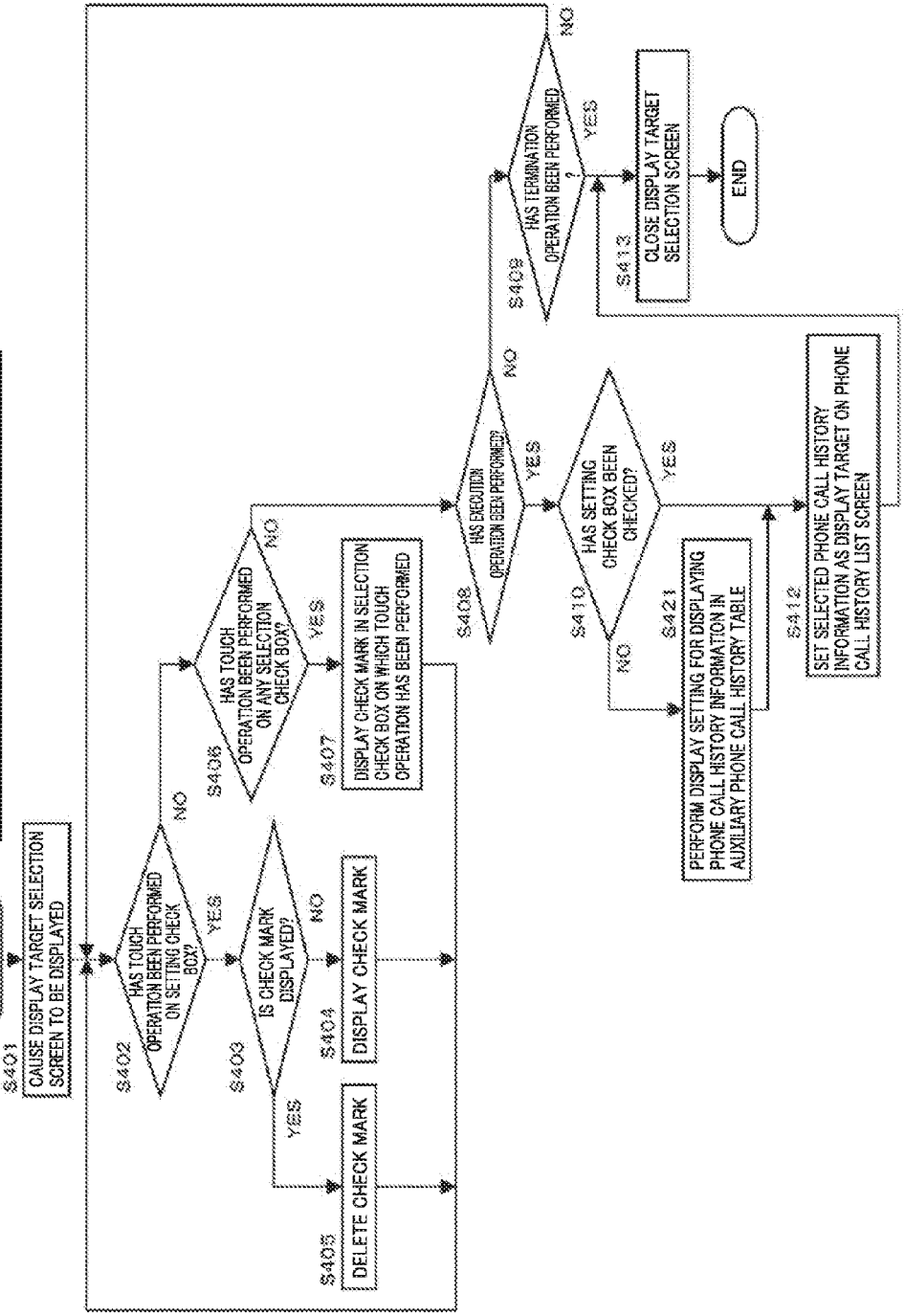
FIG. 21 is a flowchart showing a display target selection process according to Modification 2.

FIG. 21 is a flowchart showing a display target selection process according to Modification 2. In Modification 2, step S411 shown in FIG. 12 is deleted, and step S421 is added. In Modification 2, when setting check box 112*a* has not been checked (NO in S410), control unit 11 can perform a display setting for causing display 3 to display the phone call history information recorded in auxiliary phone call history table 12*e* (S421).

FIG. 22 is a flowchart showing a history display process according to Modification 2. In Modification 2, subsequent to the determination of a display target (S501), control unit 11 can determine whether or not the display setting for causing display 3 to display the phone call history information recorded in auxiliary phone call history table 12*e* has been performed (S502, S505, S508, S511). When the display setting has been performed (YES in S502, YES in S505, YES in S508, and YES in S511), control unit 11 can extract the phone call history information of all or any type from auxiliary phone call history table 12*e* (S503, S506, S509, S512), and can extract the whole recorded phone call history information from all or any of phone call history table 12*b*, 12*c* and 12*d* depending on the setting of a display target (S504, S507, S510, S513). When the display setting has not been performed (NO in S502, NO in S505, NO in S508, NO in S511), control unit 11 can extract the whole recorded phone call history information from all or any of phone call history table 12*b*, 12*c* and 12*d* without extracting the phone call history information from auxiliary phone call history table 12*e* (S504, S507, S510, S513). Control unit 11 can cause display 3 to display phone call history list screen 110 including the extracted phone call history information (S514). When the phone call history information on a deletion target person has been deleted from phone call history tables 12*b*, 12*c* and 12*d* and when the display setting has not been performed, the phone call history information is not displayed on phone call history list screen 110. When the phone call history information on a deletion target person has not been deleted from phone call history tables 12*b*, 12*c* and 12*d*, or when the display setting has been performed even if the phone call history information has been deleted, the phone call history information on a deletion target person is displayed on phone call history list screen 110.

According to Modification 2, operations and effects similar to those of the above-described embodiment can be exerted.

In phone call history tables 12*b*, 12*c* and 12*d*, when the amount of data to be stored reaches an allowable amount of data, old phone call history information will be deleted when new phone call history information is stored. When the phone call history information on a deletion target person is left in phone call history tables 12*b*, 12*c* and 12*d* in a hidden state, the phone call history information may be deleted from phone call history tables 12*b*, 12*c* and 12*d* while in a hidden state before a user notices due to data capacity limitations. Then, the user can no longer confirm the phone call history information brought into the hidden state. With the configuration of Modification 2, the phone call history information on a deletion target person is moved from phone call history tables 12*b*, 12*c* and 12*d* to auxiliary phone call history table 12*e*, and thus the phone call history information can be left for a long period of time in a hidden state. A user can easily confirm the phone call history information brought into the hidden state in the future.

Other Embodiments

In the above-described embodiment and modifications, history information related to a call (phone call history information) has been cited as history information related to communication, and a configuration in which an embodiment is applied when the phone call history information is displayed on phone call history list screen 110 has been described. An embodiment may be applied when history information related to mail (e-mail or short message) (mail history information) is displayed on a mail history list screen.

The mail history information includes transmission history information and reception history information. Memory 12 includes a transmission history table in which the transmission history information is recorded and a reception history table in which the reception history information is recorded. In the case of e-mail, the transmission history information includes an e-mail address and a transmitted date and time, while the reception history information includes an e-mail address and a received date and time. In the case of a short message, the transmission history information may include a telephone number and a transmitted date and time, while the reception history information may include a telephone number and a received date and time.

Control unit 11 may execute processes similar to the history recording process (FIG. 6), the contact deletion process (FIGS. 8, 16, 20), the history display process (FIGS. 10, 18, 22) and the display target selection process (FIGS. 12, 17B, 21) described in the above-described embodiment and modifications on the mail history information. When contact information is deleted by a user's deleting operation, the mail history information including the e-mail address (telephone number) included in the deleted contact information is no longer displayed on display 3 by the mail history list screen.

In the above-described embodiment, the call origination history information, call reception history information and missed call history information may be recorded respectively in corresponding call origination history table 12b, call reception history table 12c and missed call history table 12d. The form in which these pieces of phone call history information are recorded may be of any type. For example, these pieces of phone call history information may be recorded in a single phone call history table in a mixed manner. In this case, information indicating the type of a call, whether transmitted, received or missed, may be recorded in the phone call history table for each piece of phone call history information.

In the above-described embodiment, a user can select whether or not the phone call history information on a deletion target person is to be set as a hidden target, and whether or not to hide the phone call history information having been set as a hidden target. A configuration in which a user cannot perform these selections may be employed. In this case, once the contact information is removed, the phone call history information corresponding thereto is automatically removed from the display by phone call history list screen 110. When such a configuration is employed, it may be configured such that a user can select a desired mode between a first mode and a second mode. In the first mode, even if contact information is deleted, the phone call history information corresponding thereto is displayed on phone call history list screen 110. In the second mode, when contact information is deleted, the phone call history information corresponding thereto is no longer displayed on phone call history list screen 110. Of course, even when the above-described configuration is not employed, namely, even when the configuration of the above-described embodiment is employed, it may be configured such that mode selection can be made between the first and second modes.

In the above-described embodiment, the present disclosure is applied to a smartphone type mobile phone. The present disclosure is not limited thereto, but may be applied to other types of mobile phones, such as a bar phone, a flip phone, a slide phone, and the like.

Embodiments of the present disclosure are not limited to mobile phones, but may be applied to various types of communication devices including mobile terminal devices, such as a PDA (Personal Digital Assistant) and a tablet PC, fixed phone, and the like.

In a communication device according to an aspect, the first storage unit may be configured to store a name in association with the identification information. In this case, when causing the display to display the history information, the at least one processor is configured to read the name associated with the identification information from the first storage unit to be displayed on the display.

In the communication device according to an aspect, the at least one processor may be configured to determine whether or not to cause the display to display the history information including the identification information included in the deleted contact information, based on a selection operation received by the operation unit.

In the communication device according to an aspect, when the contact information is deleted from the first storage unit, the at least one processor may be configured to set the history information as a hidden target to be hidden on the display, the history information including the identification information included in the deleted contact information. In this case, the at least one processor may be configured to hide the history information set as the hidden target on the display.

With the above-described configuration, the at least one processor may be configured to perform a hiding setting of hiding the history information set as the hidden target on the display based on a selection operation received by the operation unit. In this case, the at least one processor may be configured to hide the history information set as the hidden target on the display when the hiding setting is performed.

In the communication device according to an aspect, when the contact information is deleted from the first storage unit, the at least one processor may be configured to delete from the first storage unit the history information including the identification information included in the deleted contact information.

With the above-described configuration, the memory further includes a second storage unit, and the at least one processor may be configured to store the history information deleted from the first storage unit in the second storage unit. In this case, the at least one processor may be configured to perform a display setting of causing the display to display the history information stored in the second storage unit based on a selection operation received by the operation unit. When the display setting is performed, the at least one processor may be configured to cause the display to display the history information stored in the second storage unit together with the history information stored in the first storage unit.

In the communication device according to an aspect, the communication may include at least one of a call and e-mail. When the communication includes a call, the identification information may include a telephone number. When the communication includes e-mail, the identification information may include a telephone number or an e-mail address.

The concept of the "name" may include not only names of individuals but also names of companies and the like. The concept of the "name" may include equivalents to names, such as nicknames.

In addition, various modifications can be made as appropriate to embodiments of the present disclosure within the scope of the technical idea defined in the claims.

Although the present disclosure has been described and illustrated in detail, it is clearly understood that the same is by way of illustration and example only and is not to be taken by way of limitation, the scope of the present disclosure being interpreted by the terms of the appended claims.

The invention claimed is:

1. A communication device comprising:

a display;

a memory configured to store one or more contacts and an associated communication history, wherein each of the one or more contacts comprises a contact identifier, and wherein the communication history comprises a plurality of entries representing one or more of past outgoing communications and received communications associated with the one or more contacts; and at least one processor configured to receive an operation to delete one of the one or more contacts from the memory; and, based on the operation to delete the one contact, delete the one contact from the memory, and, when subsequently displaying information from the communication history on the display, hide information for any of the plurality of entries in the communication history that are associated with the contact identifier for the deleted one contact, wherein the hiding information for any of the plurality of entries in the communication history that are associated with the contact identifier for the deleted one contact comprises deleting any of the plurality of entries, from the communication history information in the memory, that are associated with the contact identifier for the deleted one contact, and storing the deleted entries in an auxiliary communication history table that is separate from the communication history stored in the memory.

2. The communication device according to claim 1, wherein each of the one or more contacts comprises a name in association with the contact identifier, and wherein displaying information from the communication history information on the display comprises, for each of the plurality of entries that are not hidden, displaying the name associated with a contact identifier associated with the entry.

3. The communication device according to claim 1, wherein hiding information for any of the plurality of entries in the communication history information that are associated with the contact identifier for the deleted one contact is further based on a user selection of a hiding setting.

4. The communication device according to claim 1, wherein the communication history includes entries representing at least one of a call history and e-mail history, wherein entries representing a call history comprise a telephone number, wherein entries representing an e-mail history comprise an e-mail address, and wherein each contact identifier in the one or more contacts comprises either the telephone number or the e-mail address.

5. A method of displaying communication history information on a display of a communication device, the method comprising:

storing one or more contacts an associated communication history in a memory, wherein each of the one or more contacts comprises a contact identifier, and wherein the communication history comprises a plurality of entries representing one or more of past outgoing communications and received communications associated with the one or more contacts;

receiving an operation to delete one of the one or more contacts from the memory; and, based on the operation to delete the one contact, deleting the one contact from the memory, and, when subsequently displaying information from the communication history on the display, hiding information for any of the plurality of entries in the communication history that are associated with the contact identifier for the deleted one contact, wherein the hiding information for any of the plurality of entries in the communication history that are associated with the contact identifier for the deleted one contact comprises deleting any of the plurality of entries, from the communication history information in the memory, that are associated with the contact identifier for the deleted one contact, and storing the deleted entries in an auxiliary communication history table that is separate from the communication history stored in the memory.

* * * * *

UNITED STATES PATENT AND TRADEMARK OFFICE
CERTIFICATE OF CORRECTION

PATENT NO.        : 9,807,597 B2
APPLICATION NO.   : 15/177235
DATED             : October 31, 2017
INVENTOR(S)       : Yuki Yamada Page 1 of 1

It is certified that error appears in the above-identified patent and that said Letters Patent is hereby corrected as shown below:

In the Claims

Column 20, Line 14, Claim 5: please add "and" after "contacts" and before "an".

Signed and Sealed this
Twentieth Day of February, 2018

Andrei Iancu
*Director of the United States Patent and Trademark Office*